(12) United States Patent
Sugiyama

(10) Patent No.: US 7,817,879 B2
(45) Date of Patent: Oct. 19, 2010

(54) OPTICAL WAVEGUIDE DEVICE

(75) Inventor: Masaki Sugiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/366,077

(22) Filed: Feb. 5, 2009

(65) Prior Publication Data

US 2009/0202198 A1    Aug. 13, 2009

(30) Foreign Application Priority Data

Feb. 8, 2008    (JP)    ............................. 2008-028556

(51) Int. Cl.
*G02B 6/42* (2006.01)
(52) U.S. Cl. .................. 385/9; 385/3; 385/29; 385/131
(58) Field of Classification Search ...................... 385/3, 385/9, 29, 129–132
See application file for complete search history.

(56) References Cited

U.S. PATENT DOCUMENTS 6,115,520 A * 9/2000 Laskowski et al. ............ 385/50

| | | | |
|---|---|---|---|
| 7,177,490 B2 | 2/2007 | Sugiyama et al. | |
| 2004/0184755 A1* | 9/2004 | Sugiyama et al. | ............ 385/129 |
| 2005/0196092 A1* | 9/2005 | Enokihara et al. | .............. 385/2 |

FOREIGN PATENT DOCUMENTS

JP    2004-287093    10/2004

* cited by examiner

*Primary Examiner*—Charlie Peng
(74) *Attorney, Agent, or Firm*—Staas & Halsey LLP

(57) ABSTRACT

An optical waveguide device including a dielectric substrate and a folded waveguide formed on the substrate, including a first waveguide and a second waveguide, one part of the first waveguide being connected to one end of the second waveguide at a first coupling portion, the other end of the second waveguide connected to another part of the first waveguide at a second coupling portion, the first waveguide being straight or curved with a radius of curvature larger than or equal to a first curvature radius, and the second waveguide being straight or curved with a radius of curvature smaller than the first curvature radius. An outer groove is formed on the substrate along an outer peripheral of the folded waveguide, an input-side inner groove is formed on the substrate near a first coupling portion, and an output-side inner groove is formed on the substrate near a second coupling portion.

23 Claims, 31 Drawing Sheets

OPTICAL WAVEGUIDE DEVICE

CROSS-REFERENCE TO RELATED APPLICATION(S)

This application is based upon and claims the benefit of priority of the prior Japanese Patent Application No. 2008-028556, filed on Feb. 8, 2008, the entire contents of which are incorporated herein by reference.

BACKGROUND OF THE INVENTION

1. Field of the Invention

The invention relates to an optical waveguide device and, for example, includes an optical waveguide device that is used in an optical modulator in which an optical waveguide is formed on a dielectric substrate to perform optical modulation.

2. Description of the Related Art

An optical modulator is widely used as an optical waveguide device for optical communication. One of configurations of the optical modulator includes an optical waveguide device in which an optical waveguide is formed on a substrate, and external modulation is performed to change the amount of absorption of light in the optical waveguide by a voltage applied to the optical waveguide to thereby convert an electric signal into an optical signal.

FIG. 27 is a view that illustrates an optical modulator. FIG. 28 is a cross-sectional view of the optical modulator. In the optical modulator 100, a metal layer, such as Ti (titanium), is formed on a portion of a crystal substrate 101 that uses LiNbO3 (or LiTaO2) and thermally diffused or patterned, and is then proton exchanged in benzoic acid to form a Mach-Zehnder interferometer-type optical waveguide 110.

The optical waveguide 110 is formed of an input waveguide 111, concurrent waveguides 112a and 112b, and an output waveguide 113. The optical waveguide 110 constitutes a Mach-Zehnder interferometer. A signal electrode 102 is provided on the concurrent waveguide 112a, and a ground electrode 103 is provided on the concurrent waveguide 112b. Thus, a coplanar electrode is formed.

When a Z-cut substrate is used, to utilize a variation in refractive index due to an electric field in a Z direction, as illustrated in FIG. 28, the electrodes are arranged immediately above the waveguides and patterned. In addition, in order to prevent light that propagates in the concurrent waveguides 112a and 112b from being absorbed by the signal electrode 102 or the ground electrode 103; a buffer layer 104 is provided between the crystal substrate 101 and the signal electrode 102 and ground electrode 103.

When the optical modulator 100 is driven at a high speed, the termination of the signal electrode 102 and the termination of the ground electrode 103 are connected by a resistor R0 to serve as a traveling-wave electrode, and a microwave signal is applied from an input side. At this time, the refractive indices of the concurrent waveguides 112a and 112b respectively change like $+\Delta na$ and $-\Delta nb$, and a phase difference between the concurrent waveguides 112a and 112b changes. In accordance with the phase difference, the intensity of an output that is obtained by interference of the outputs of the concurrent waveguides 112a and 112b changes, and an intensity-modulated signal light is output from the output waveguide 113.

In addition, by changing the cross-sectional shapes of the electrodes, the effective refractive index of a microwave that propagates in the signal electrode 102 is controlled, and the speed at which light propagates in the concurrent waveguides 112a and 112b is matched with the speed at which a microwave propagates in the signal electrode 102. Thus, it is possible to obtain high-speed optical response characteristics. Note that the commercial optical modulator 100 is generally driven at a bit rate of 10 Gb/s or 40 Gb/s per channel.

On the other hand, a device that applies the optical modulator 100 includes an RZ modulator that generates an RZ (Return to Zero) optical signal.

FIG. 29 is a view that illustrates the RZ modulator. The RZ modulator 50 has a configuration such that two Mach-Zehnder interferometer-type optical waveguides are connected by a folded waveguide 53.

The optical waveguide is formed of an input waveguide 51, concurrent waveguides 52a-1 and 52b-1, the folded waveguide 53, concurrent waveguides 52a-2 and 52b-2, and an output waveguide 54. Two Mach-Zehnder modulators 5a and 5b are connected by the folded waveguide 53.

A signal electrode 55-1 is provided on the concurrent waveguide 52a-1, and a ground electrode 56 is provided on the concurrent waveguide 52b-1. A signal electrode 55-2 is provided on the concurrent waveguide 52a-2, and a ground electrode 56 is provided on the concurrent waveguide 52b-2.

FIG. 30 is a view that illustrates the folded waveguide 53. The folded waveguide 53 is formed of straight waveguides 53a at straight portions and an arc-shaped curved waveguide 53b having a small radius of curvature. A small optical loss due to radiation is required for the curved waveguide 53b.

Here, when continuous light enters the input waveguide 51 of the Mach-Zehnder modulator 5a, the continuous light is Y-branched and then travels in the concurrent waveguides 52a-1 and 52b-1. At this time, an NRZ (Non Return to Zero) electric signal is input to the signal electrode 55-1 to drive the Mach-Zehnder modulator 5a. Thus, an NRZ optical signal is generated at a multiplexing portion of the Mach-Zehnder modulator 5a.

In addition, the NRZ optical signal enters the Mach-Zehnder modulator 5b through the folded waveguide 53, and is Y-branched, and then propagates through the concurrent waveguides 52a-2 and 52b-2. At this time, a clock electric signal is input to the signal electrode 55-2 to drive the Mach-Zehnder modulator 5b. Thus, an RZ-modulated optical signal is generated at a multiplexing portion of the Mach-Zehnder modulator 5b, and it is possible to obtain an RZ optical signal from the output waveguide 54.

In this manner, by connecting the two Mach-Zehnder modulators 5a and 5b through the folded waveguide 53, the long Mach-Zehnder modulators 5a and 5b may be arranged concurrent to each other. Thus, it is possible to implement a compact device structure.

As an existing optical modulator having a folded waveguide, there is a technique for suppressing a radiation loss that occurs in the folded waveguide by providing a groove on the outer peripheral side of the folded waveguide, which is, for example, described at paragraphs [0012] and [0013] and in FIG. 1 in Japanese Unexamined Patent Application Publication No. 2004-287093 ('093 document).

Ti is diffused on the surface of a substrate at a high temperature higher than or equal to 1000° C. to increase the refractive index of a metal portion as compared with the surrounding portions. Thus, an optical waveguide is formed to confine light while allowing the light to propagate.

A method of manufacturing an optical waveguide generally employs Ti diffusion or proton exchange, which can reduce a propagation loss. Even the optical waveguide manufactured by these methods does not sufficiently confine light, and there is a drawback that a radiation loss occurs at the curved portion of the optical waveguide.

For example, in the above RZ modulator 50, when light propagates in the folded waveguide 53, particularly, in the curved waveguide 53b that is largely curved (having a smaller radius of curvature), radiation of light toward the outside of the curved waveguide 53b remarkably appears.

Thus, in the configuration described in '093 document, a groove is recessed in the substrate on the outer peripheral side of the folded waveguide 53 to suppress a radiation loss. FIG. 31 is a view that illustrates a configuration that a groove is provided on the outer peripheral side of the folded waveguide 53. FIG. 32 is a cross-sectional view of the folded waveguide 53 and the groove.

The substrate on the outer peripheral side of the folded waveguide 53 is recessed by etching, or the like, to form the groove 57. In addition, to prevent a scattering loss due to roughness of a groove side surface, a buffer layer 58 is provided on the side surface of the groove 57. With the above structure, confinement of light is enhanced to prevent a radiation loss.

However, in the above described related art, there is a problem that, during manufacturing the device, when the distance between the pattern of the folded waveguide 53 and the pattern of the groove 57 deviates from a designed value due to a manufacturing error, a radiation loss increases and, therefore, a desired quality is not ensured.

FIG. 33 is a graph that illustrates an increase in radiation loss which occurs in response to a deviation in distance between the folded waveguide 53 and the groove 57. The ordinate axis represents a loss dB, and the abscissa axis represents a deviation μm of the groove 57. FIG. 33 illustrates an increase in radiation loss when a deviation of the groove 57 occurs vertically with respect to the folded waveguide 53.

When the deviation of the groove 57 is 0 μm, the loss is 1.4 dB, which is a desired designed value. In addition, it appears that, when the groove 57 deviates from 0 μm in a positive direction (in a direction in which the light output side waveguide of the folded waveguide 53 approaches the groove 57, and the light input side waveguide of the folded waveguide 53 leaves the groove 57), or when the groove 57 deviates from 0 μm in a negative direction (in a direction in which the light input side waveguide of the folded waveguide 53 approaches the groove 57, and the light output side waveguide of the folded waveguide 53 leaves the groove 57), a radiation loss increases in a parabolic curve.

FIG. 34 is a view that illustrates the cause of occurrence of a radiation loss when there is a deviation in distance between the folded waveguide 53 and the groove 57. When the distance between the folded waveguide 53 and the groove 57 deviates from a designed value, the modes of light do not match at a coupling portion between the straight waveguide 53a and the curved waveguide 53b (for example, mismatch occurs between the optical axis of light that propagates in the straight waveguide 53a and the optical axis of light that propagates in the curved waveguide 53b). Thus, scattering occurs and, as a result, a radiation loss increases.

Thus, with the configuration that the groove 57 is provided on the outer peripheral side of the folded waveguide 53, which is described in the related art, a radiation loss may be ideally suppressed. However, the device can not always be manufactured in accordance with a designed value at the time of manufacturing. Therefore, when the groove 57 deviates from the designed value due to a manufacturing error, a radiation loss increases and, as a result, the quality degrades. Hence, it is necessary to increase a tolerance for the manufacturing error to effectively suppress a radiation loss even when there is a manufacturing error.

SUMMARY OF THE INVENTION

An optical waveguide device including a dielectric substrate, a folded waveguide formed on the substrate, the folded waveguide including a first waveguide and a second waveguide, one part of the first waveguide being connected to one end of the second waveguide at a first coupling portion, the other end of the second waveguide connected to another part of the first waveguide at a second coupling portion, the first waveguide being straight or curved with a radius of curvature larger than or equal to a first curvature radius, and the second waveguide being straight or curved with a radius of curvature smaller than the first curvature radius, an outer groove formed on the substrate along an outer peripheral of the folded waveguide, an input-side inner groove formed on the substrate near a first coupling portion and provided on an inner peripheral of the first waveguide, and an output-side inner groove formed on the substrate near a second coupling portion and provided on an inner peripheral of the first waveguide.

The outer groove and the input-side inner groove near the first coupling portion, and the outer groove and the output-side inner groove near the second coupling portion both form ridge structures.

An optical waveguide device including a dielectric substrate, a light input side Mach-Zehnder interferometer-type optical waveguide located on a light input side, a light output side Mach-Zehnder interferometer-type optical waveguide located on a light output side, a folded waveguide formed on the substrate, the folded waveguide including a first waveguide and a second waveguide, the first waveguide being connected to the light input side Mach-Zehnder interferometer-type optical waveguide and the light output side Mach-Zehnder interferometer-type optical waveguide, one part of the first waveguide being connected to one end of the second waveguide at a first coupling portion, the other end of the second waveguide connected to another part of the first waveguide at a second coupling portion, the first waveguide being straight or curved with a radius of curvature larger than or equal to a first curvature radius, and the second waveguide being straight or curved with a radius of curvature smaller than the first curvature radius, an outer groove formed on the substrate along an outer peripheral of the folded waveguide, an input-side inner groove formed on the substrate near a first coupling portion and provided on an inner peripheral of the first waveguide, and an output-side inner groove formed on the substrate near a second coupling portion and provided on an inner peripheral of the first waveguide. The outer groove and the input-side inner groove near the first coupling portion, and the outer groove and the output-side inner groove near the second coupling portion both form ridge structures.

An optical waveguide device including a Mach-Zehnder interferometer-type folded waveguide that includes an input waveguide, a concurrent waveguide, and an output waveguide, the concurrent waveguide including an inner waveguide and an outer waveguide, the input waveguide being split to the inner waveguide and the outer waveguide, the inner waveguide and the outer waveguide being combined to the output waveguide, the inner waveguide and the outer waveguide respectively including a first waveguide and a second waveguide, one part of the first waveguide being connected to one end of the second waveguide at a first coupling portion, the other end of the second waveguide connected to another part of the first waveguide at a second coupling portion, respectively, the first waveguide being straight or a curved with a radius of curvature larger than or equal to a first curvature radius, the second waveguide being curved with a radius of curvature smaller than the first curvature radius, a signal electrode formed on the outer waveguide, a ground electrode formed on each side of the signal electrode, a first groove that is formed on the substrate along an inner peripheral of the inner waveguide, a second groove that is formed on the substrate along an outer peripheral of the inner waveguide and an inner peripheral of the outer waveguide, a third groove that is formed on the substrate along an outer peripheral of the outer waveguide, and a fourth groove that is formed on the substrate along an outer peripheral of the third groove.

DESCRIPTION OF THE PREFERRED EMBODIMENTS

Figure 1:
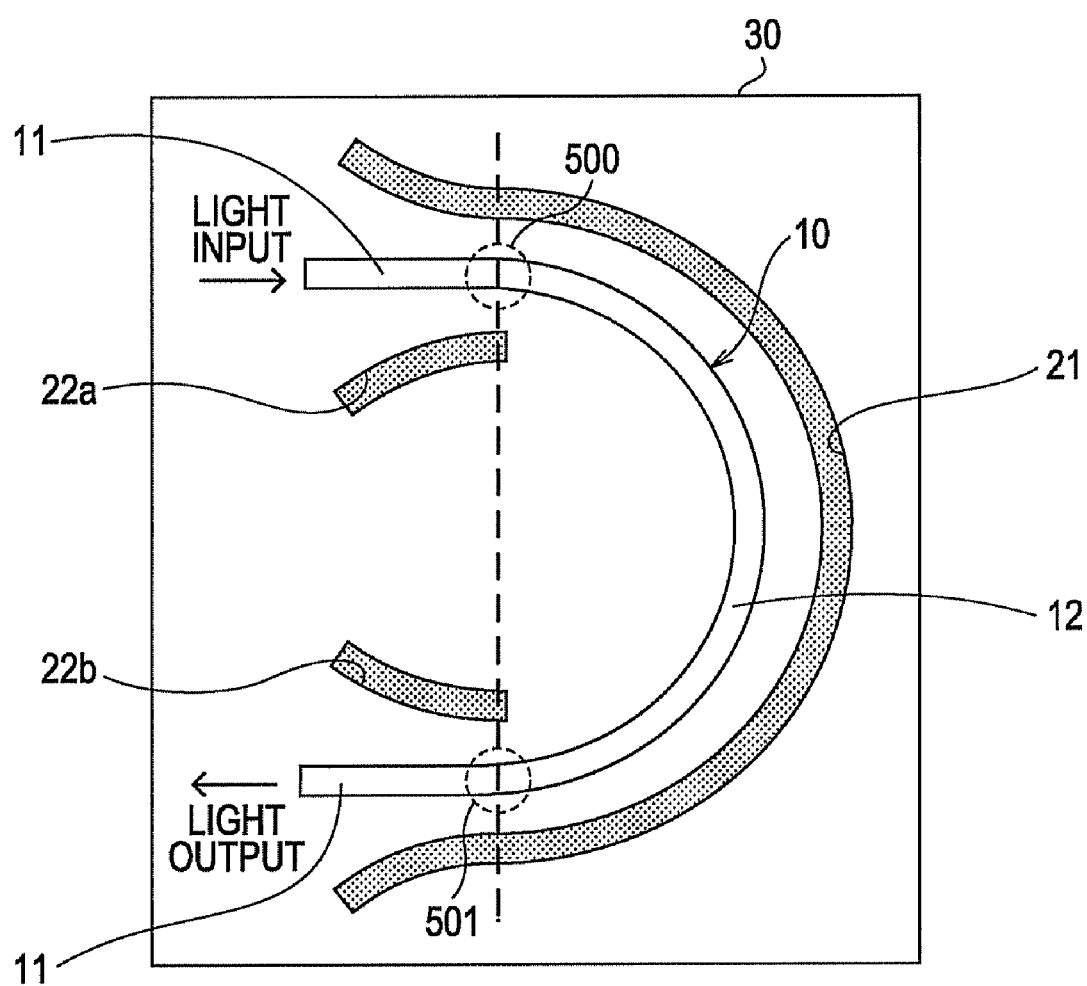
FIG. 1 is a view that illustrates a configuration of an optical waveguide device.
Figure 21:
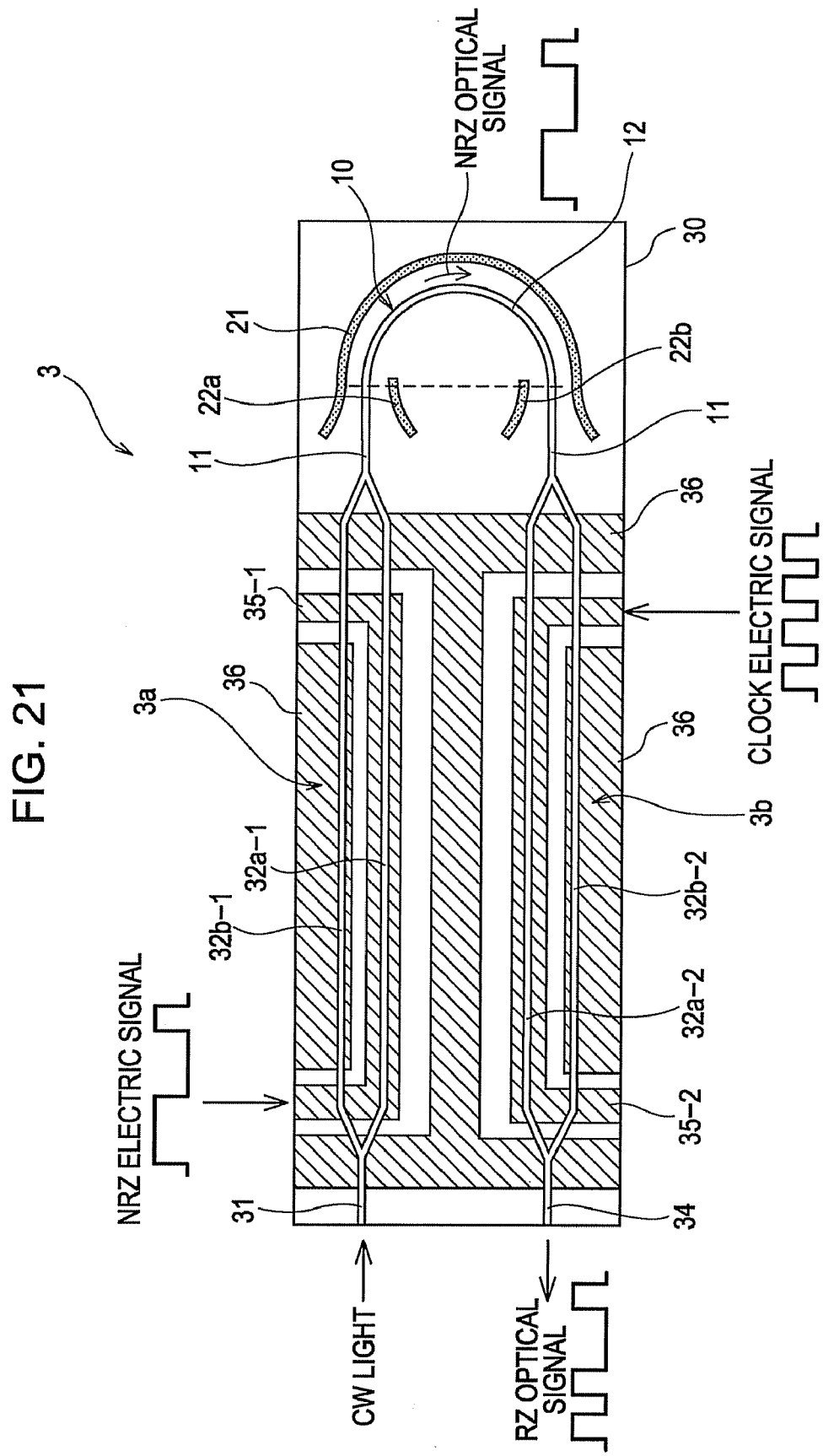
FIG. 21 is a view that illustrates an optical modulator.

FIG. 1 is a view that illustrates the configuration of an optical waveguide device according to an embodiment. FIG. 21 is a view that illustrates an optical modulator according to an embodiment. The optical waveguide device 1 is a device in which an optical waveguide is provided on a dielectric substrate 30, such as an LN (LiNbO3) crystal substrate, to execute an optical communication control, such as optical modulation. The configuration of the optical modulator illustrated in FIG. 21 will be described later.

A folded waveguide 10 is formed of first waveguides (straight waveguides) 11 and a second waveguide (curved waveguide) 12. The first waveguides (straight waveguides) 11 are waveguides with a straight shape or a curved shape having a radius of curvature larger than or equal to a predetermined value (for example, larger than or equal to 4 mm). The second waveguide (curved waveguide) 12 is a waveguide having a radius of curvature smaller than the straight waveguides 11, that is, having a largely curved arc shape.

An outer groove 21 is formed by recessing the substrate 30 along the outer periphery of the folded waveguide 10. A light input side inner groove 22a is provided on the inner peripheral of the straight waveguide 11, and is formed by recessing the substrate 30 around a light input side coupling portion 500 between the straight waveguide 11 and the curved waveguide 12. An output-side inner groove 22b is provided on the inner peripheral of the straight waveguide 11, and is formed by recessing the substrate 30 around a light output side coupling portion 501 between the straight waveguide 11 and the curved waveguide 12.

Figure 2A:
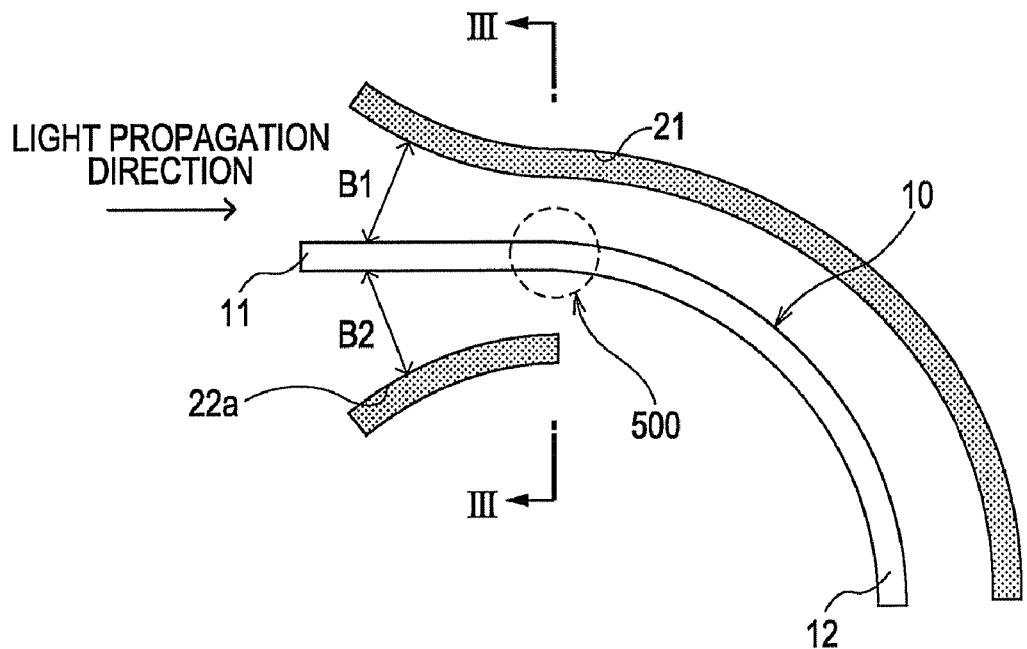
FIG. 2A is a view that illustrates a portion around a light input side coupling portion between a straight waveguide and a curved waveguide.
Figure 2B:
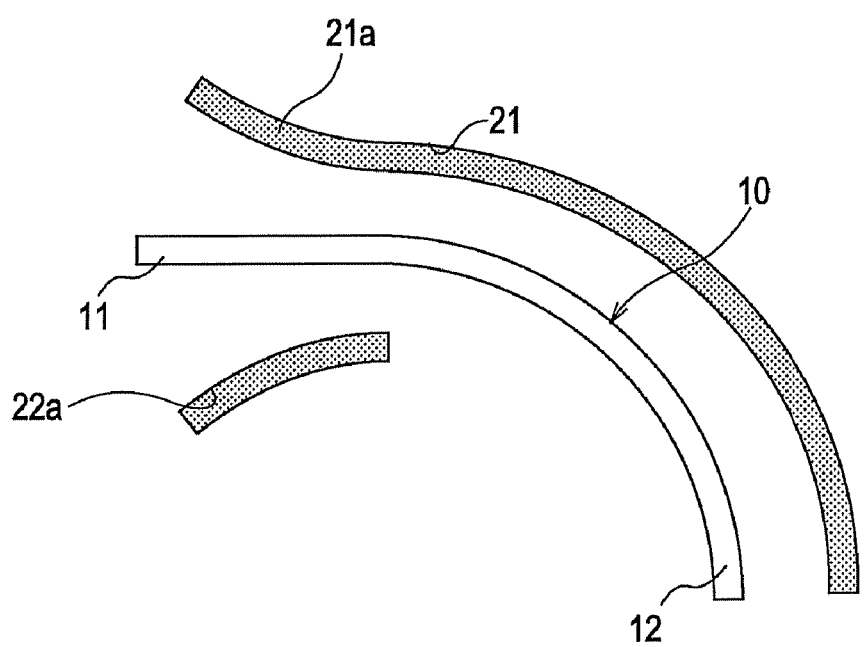
FIG. 2B is a view that illustrates the portion around the light input side coupling portion between the straight waveguide and the curved waveguide.
Figure 3:
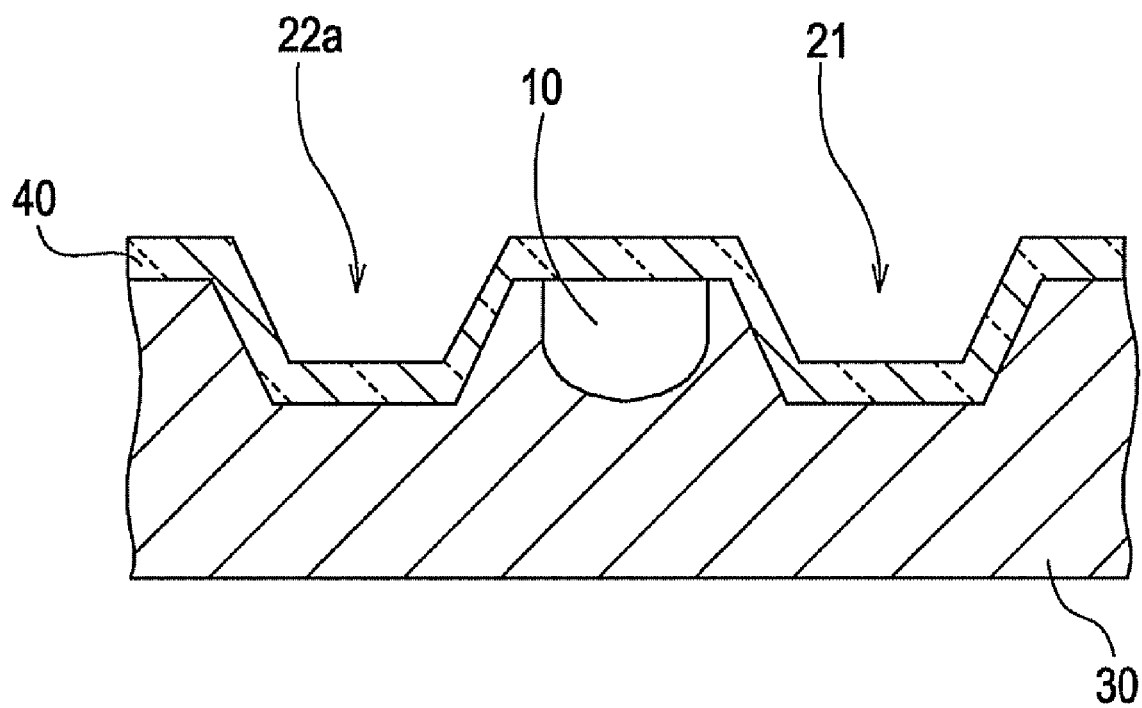
FIG. 3 is a cross-sectional view of the light input side coupling portion.

FIG. 2A and FIG. 2B are views that illustrate a portion around the light input side coupling portion 500 between the straight waveguide 11 and the curved waveguide 12. FIG. 3 is a cross-sectional view of the coupling portion 500, taken along the line III-III in FIG. 2. In FIG. 2A and FIG. 2B, the outer groove 21 is formed on the outer peripheral side of the folded waveguide 10, and the input-side inner groove 22a is formed around the coupling portion 500 between the straight waveguide 11 and the curved waveguide 12. The portion around the coupling portion 500 between the straight waveguide 11 and the curved waveguide 12 has a ridge structure illustrated in FIG. 3. That is, the grooves (the outer groove 21 and the input-side inner groove 22a) are provided on both sides of the folded waveguide 10 as illustrated in the cross-sectional view, taken along the line III-III in FIG. 2A of the coupling portion between the straight waveguide 11 and the curved waveguide 12 to form a ridge.

In addition, as indicated by a region surrounded by the dotted line in FIG. 2B, around the coupling portion 500, a portion 21a of the outer groove 21 and the input-side inner groove 22a are tapered so that a space B1 between the outer periphery of the straight waveguide 11 and the inner periphery of the outer groove 21 and a space B2 between the inner periphery of the straight waveguide 11 and the outer periphery of the input-side inner groove 22a are continuously narrowed toward a light propagation direction.

Note that when there is a fine roughness on the side surfaces of the outer groove 21 and light input side inner groove 22a, a scattering loss of light occurs due to the roughness. In order to reduce the scattering loss, a buffer layer 40 is provided on the side surfaces of the outer groove 21 and light input side inner groove 22a. The buffer layer 40 uses a material that has a refractive index smaller than the substrate 30 and that is transparent to light that propagates in the waveguide, and, for example, uses SiO2, or the like.

Figure 4A:
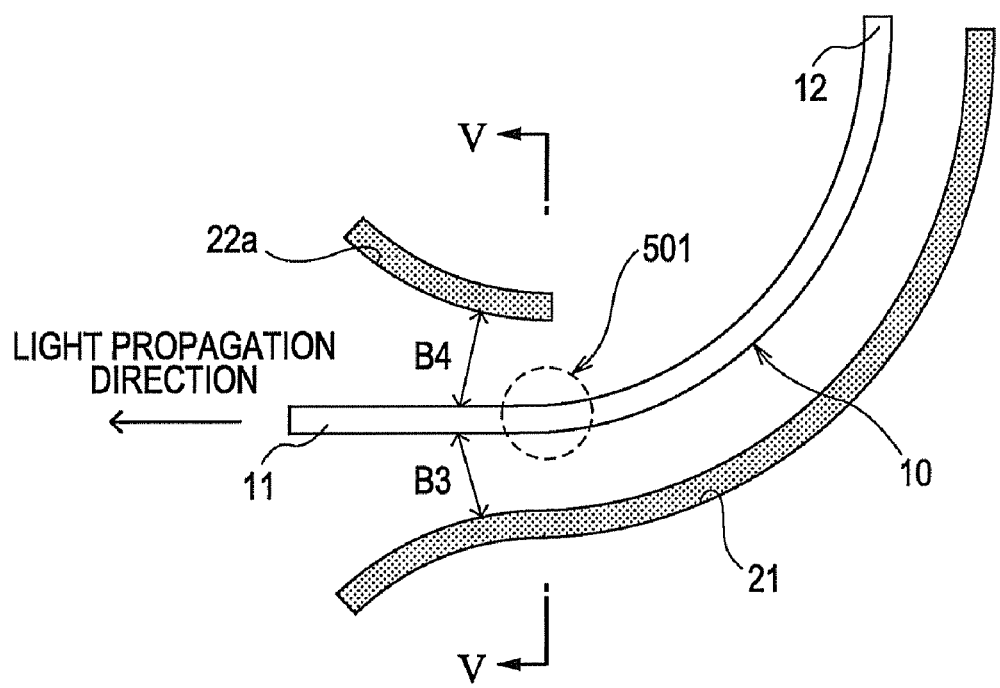
FIG. 4A and FIG. 4B are views that illustrate a portion around a light output side coupling portion between a straight waveguide and the curved waveguide.
Figure 4B:
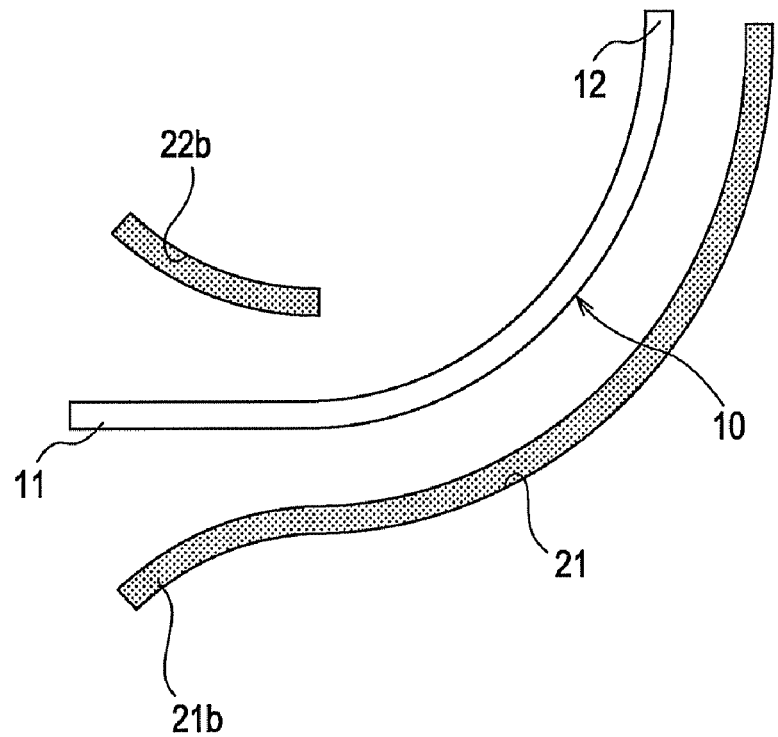
Figure 5:
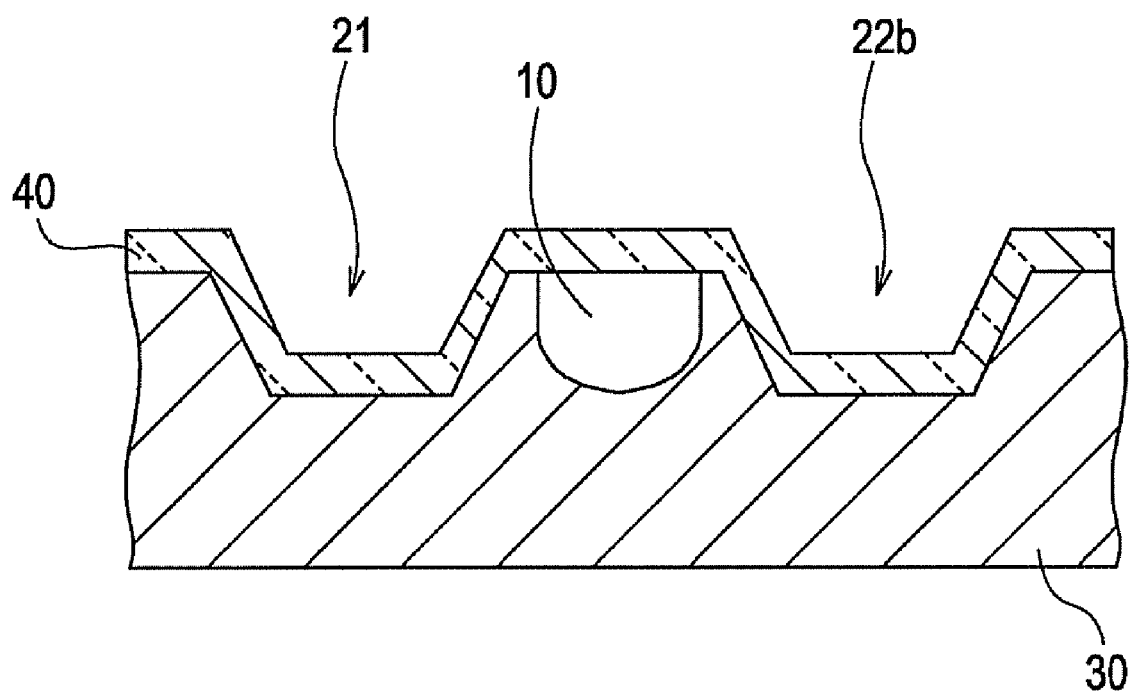
FIG. 5 is a cross-sectional view of the light output side coupling portion.

FIG. 4A and FIG. 4B are views that illustrate a portion around the light output side coupling portion 501 between the straight waveguide 11 and the curved waveguide 12. FIG. 5 is a view that illustrates a cross-sectional view of the coupling portion 501. The outer groove 21 is formed on the outer peripheral side of the folded waveguide 10, and the output-side inner groove 22b is formed around the coupling portion 501 between the straight waveguide 11 and the curved waveguide 12. Thus, a portion around the coupling portion 501 between the straight waveguide 11 and the curved waveguide 12 has a ridge structure illustrated in FIG. 5. That is, the grooves (the outer groove 21 and the output-side inner groove 22b) are provided on both sides of the folded waveguide 10 as illustrated in the cross-sectional view, taken along the line V-V in FIG. 4A, of the coupling portion between the straight waveguide 11 and the curved waveguide 12 to form a ridge.

In addition, as illustrated by a region surrounded by the dotted line in FIG. 4B, around the coupling portion 501, a portion 21b of the outer groove 21 and the output-side inner groove 22b are tapered so that a space B3 between the outer periphery of the straight waveguide 11 and the inner periphery of the outer groove 21 and a space B4 between the inner periphery of the straight waveguide 11 and the outer periphery of the output-side inner groove 22b are continuously widened toward a light propagation direction. Note that, as in the case of FIG. 3, the buffer layer 40 is also provided on the side surfaces of the output-side inner groove 22b.

Next, a difference between a configuration in which no inner groove is provided, for example, the configuration described previously herein, and a configuration in which the inner groove is provided as in the case of the optical waveguide device 1 illustrated in FIG. 1 will be described in detail. Note that, because the light input side coupling portion 500 and the light output side coupling portion 501 have the same configuration, only the coupling portion 500 will be illustrated in the following description. In addition, when the input-side inner groove 22a and the output-side inner groove 22b are not discriminated for description, they are simply referred to as an inner groove 22.

(1) State where there is no deviation in distance between the folded waveguide 10 and the outer groove 21 (when there is no manufacturing error).

Figure 6:
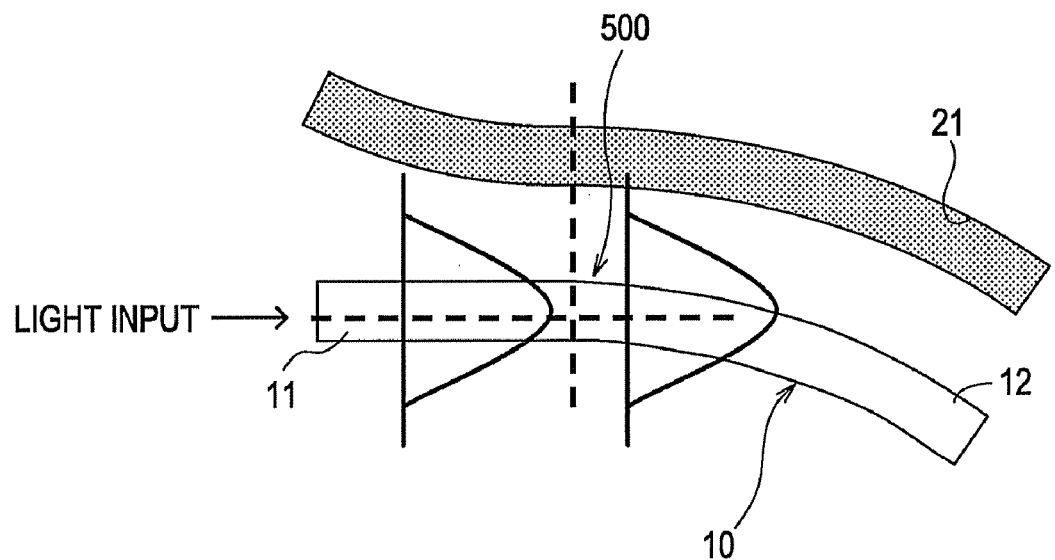
FIG. 6 is a view that illustrates a state where no inner groove is formed and there is no deviation in distance between a folded waveguide and an outer groove.
Figure 31:
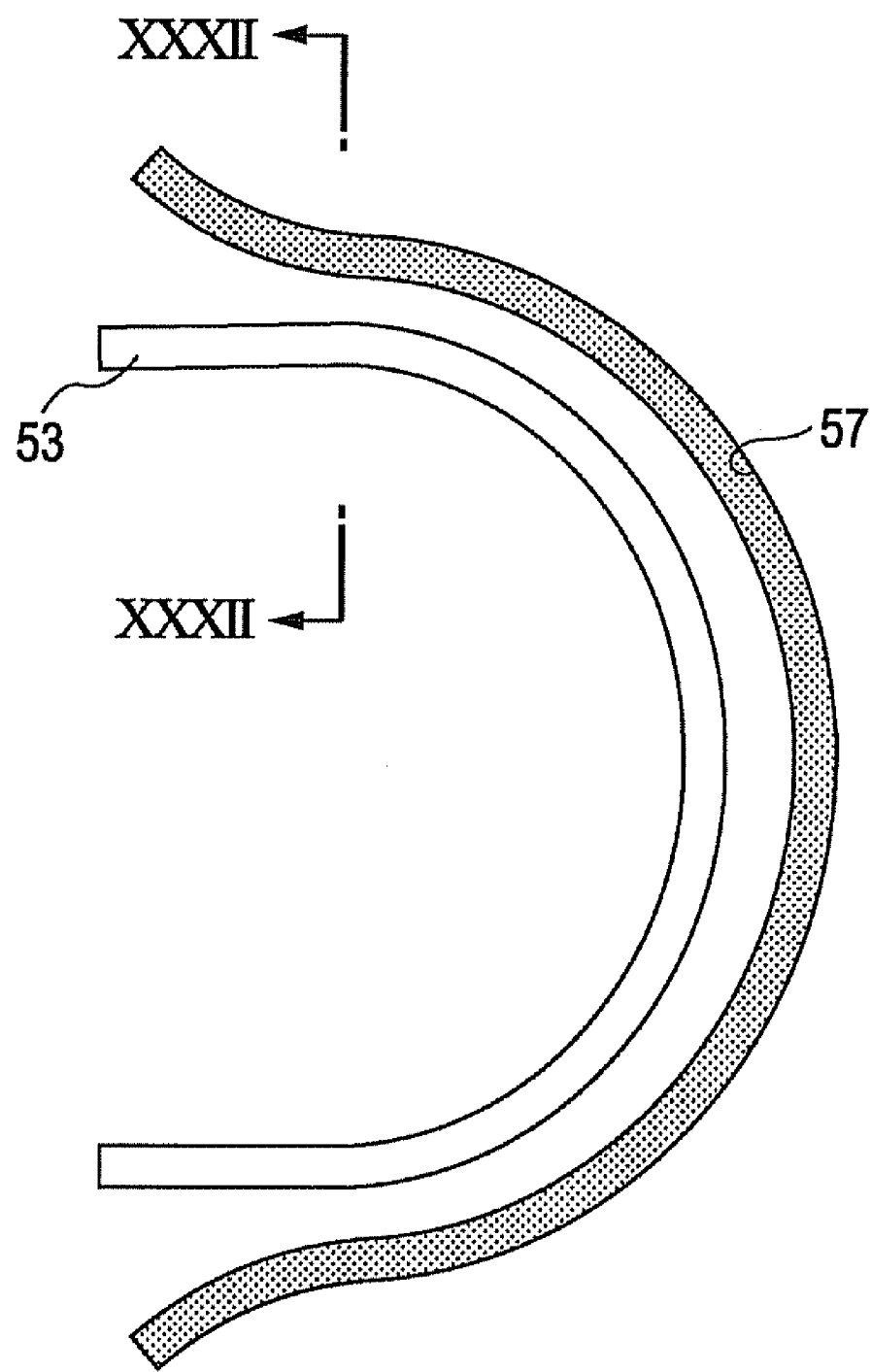
FIG. 31 is a view that illustrates the configuration that a groove is provided on the outer peripheral side of the folded waveguide.
Figure 32:
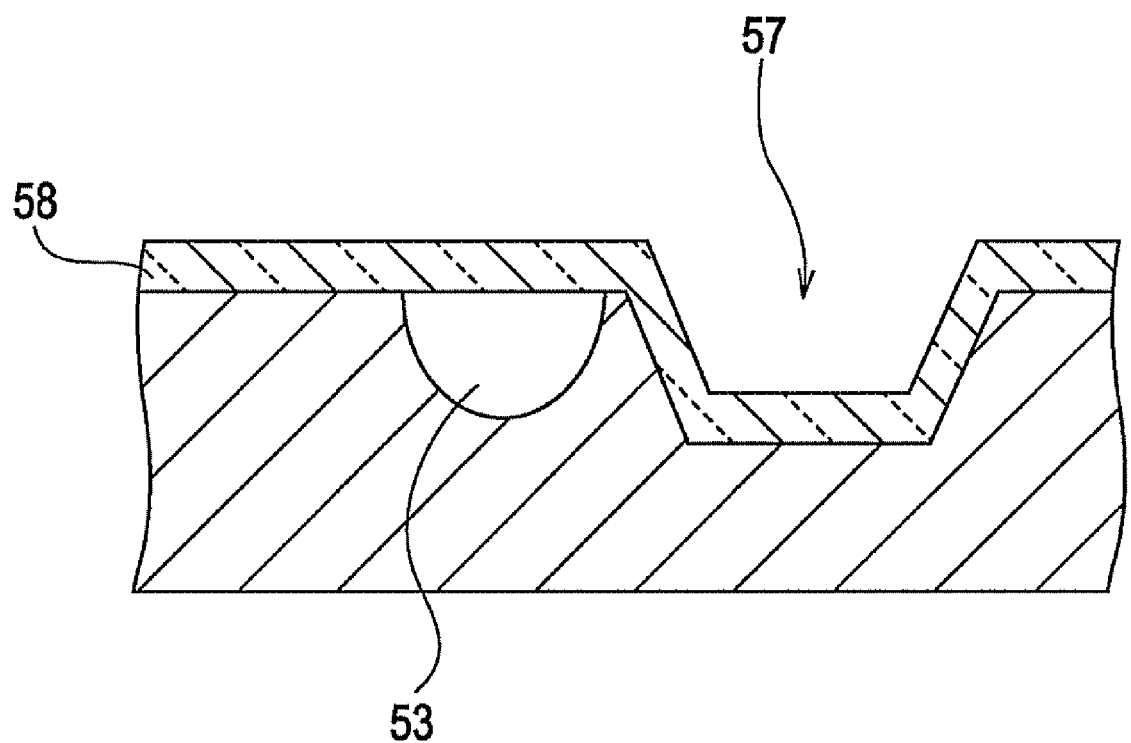
FIG. 32 is a cross-sectional view of the folded waveguide and the groove.
Figure 33:
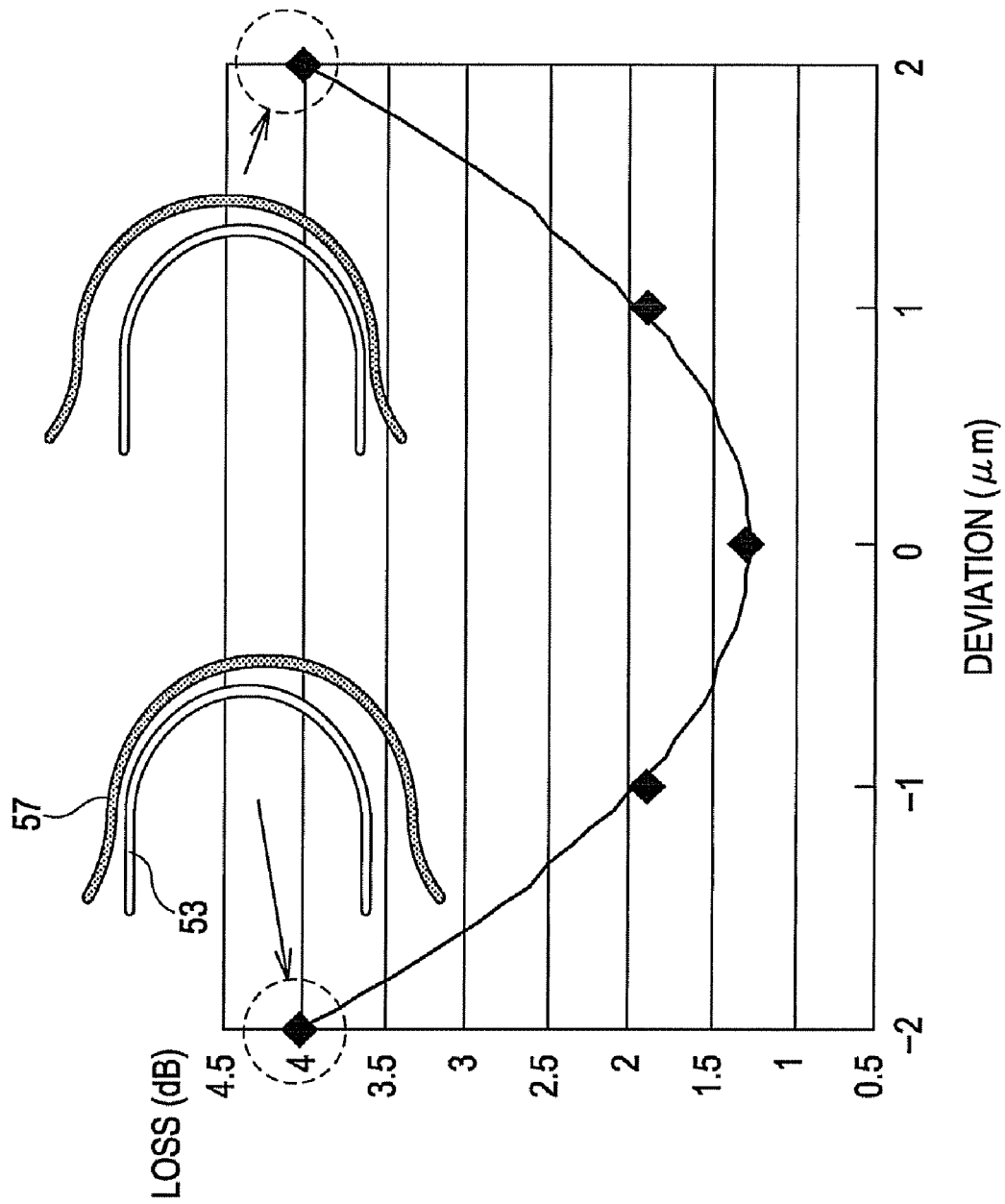
FIG. 33 is a view that illustrates an increase in radiation loss which occurs in response to a deviation in distance between the folded waveguide and the groove.
Figure 34:
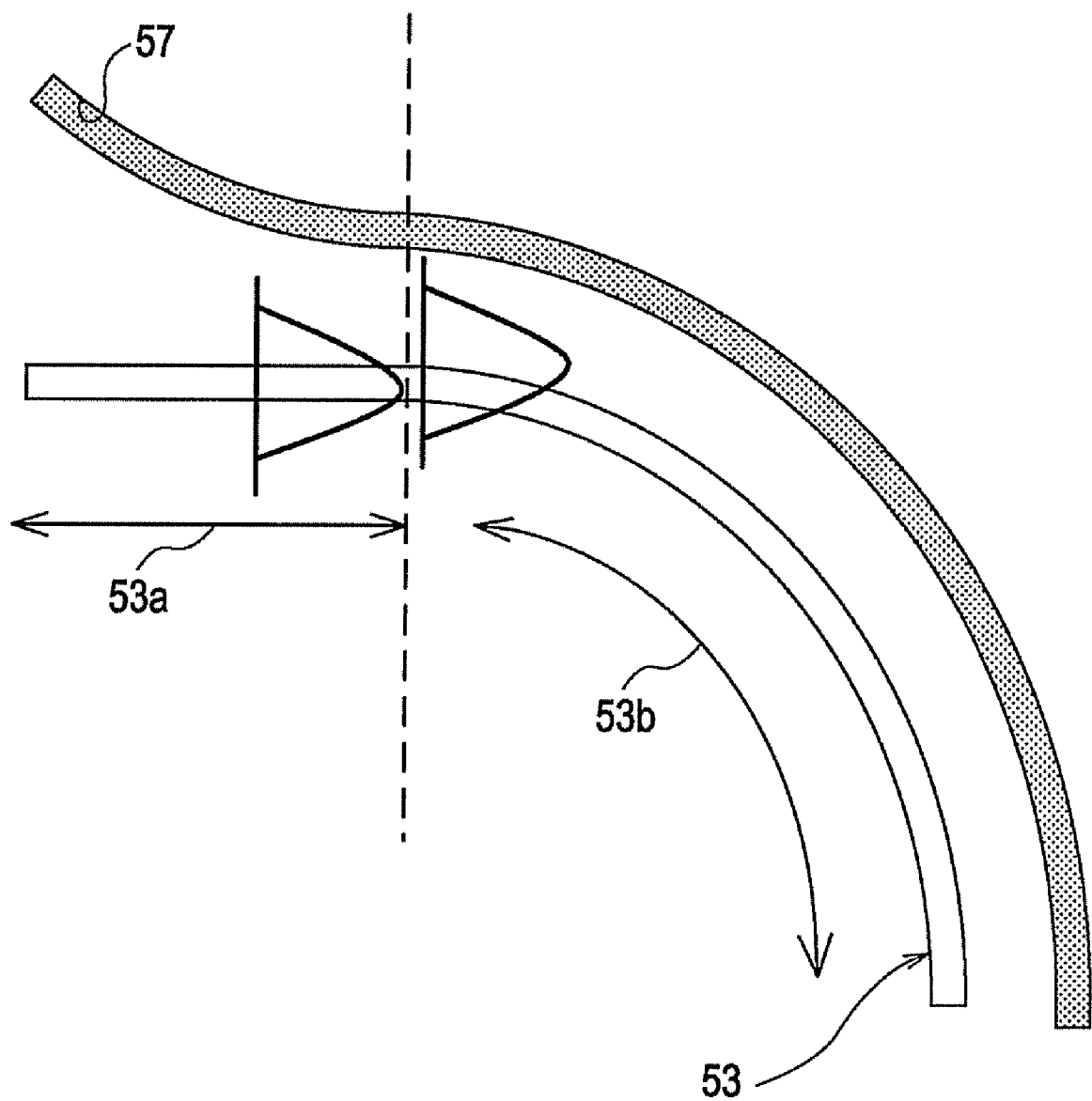
FIG. 34 is a view that illustrates the cause of occurrence of a radiation loss when there is a deviation in distance between the folded waveguide and the groove.

FIG. 6 is a view that illustrates a state of propagation of light when there is no deviation in distance between the folded waveguide 10 and the outer groove 21 in the existing folded waveguide with no inner groove 22, which is, for example, illustrated in FIG. 31. When the mode of light that propagates in the straight waveguide 11 and the mode of light that propagates in the curved waveguide 12 are designed to substantially coincide with each other at the coupling portion 500, and the distance between the folded waveguide 10 and the outer groove 21 is manufactured in accordance with a designed value, a radiation loss may be reduced (note that the target mode of light is a zero-order optical mode).

Figure 7:
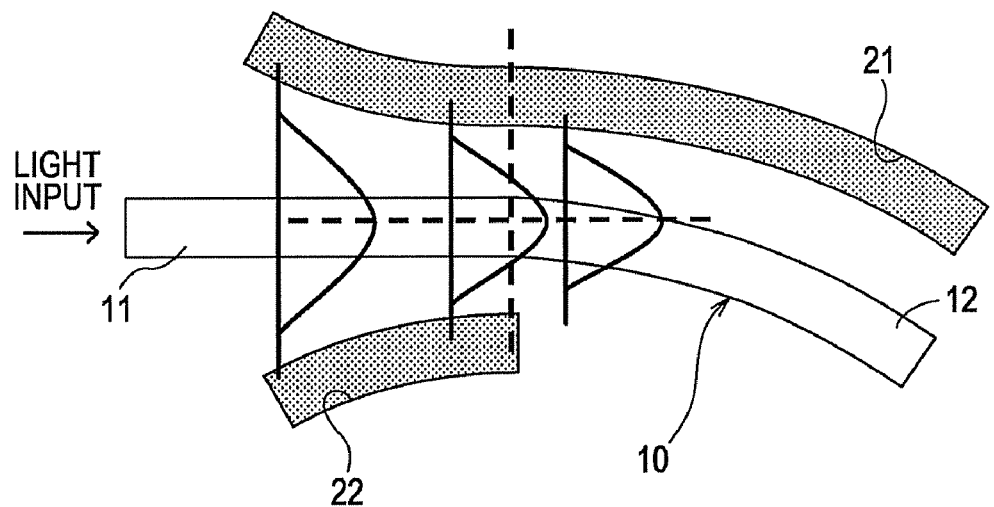
FIG. 7 is a view that illustrates a state where an inner groove is formed and there is no deviation in distance between the folded waveguide and the outer groove.

FIG. 7 is a view that illustrates a state where there is no deviation in distance between the folded waveguide 10 and the outer groove 21 in the folded waveguide having the inner groove 22, which is, for example, illustrated in FIG. 1. When it is possible to manufacture the state where there is no deviation in distance between the folded waveguide 10 and the outer groove 21, a radiation loss reduces.

(2) State where the folded waveguide 10 is located at a distance from the outer groove 21 (when there is a manufacturing error).

Figure 8:
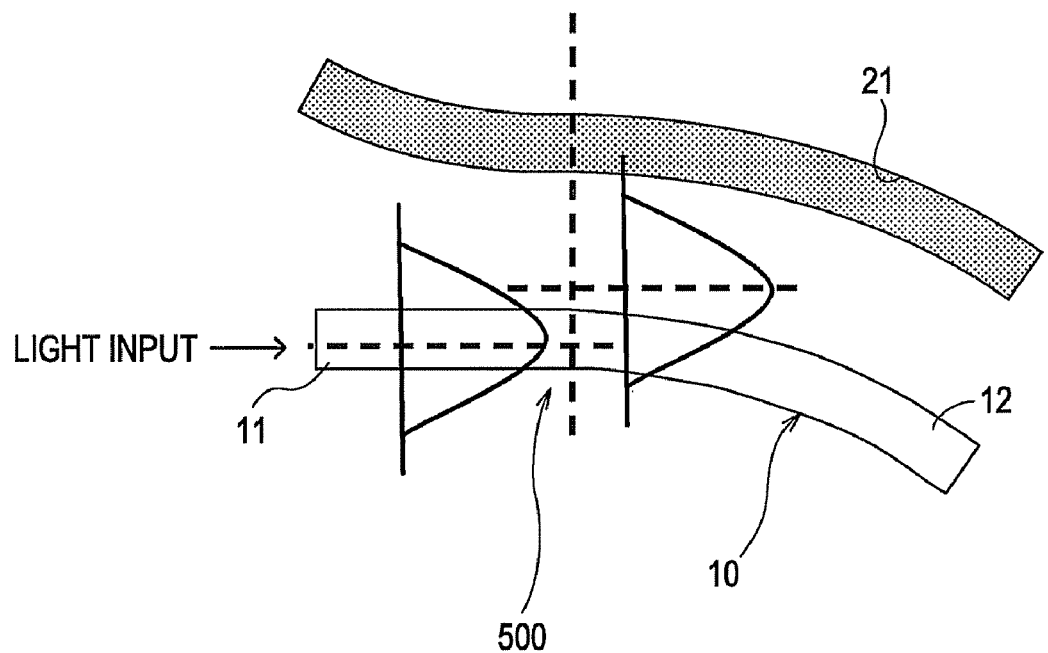
FIG. 8 is a view that illustrates a state where no inner groove is formed and there is a deviation in distance between the folded waveguide and the outer groove.

FIG. 8 is a view that illustrates a state where there is a deviation in distance between the folded waveguide 10 and the outer groove 21 and a space between the folded waveguide 10 and the outer groove 21 is larger than a designed value in the existing folded waveguide with no inner groove 22, which is, for example, illustrated in FIG. 31.

In the curved waveguide 12, because confinement of light with the outer groove 21 has a larger influence than confinement of light with the curved waveguide itself, the mode of light is distributed along the side surface of the outer groove 21. When light travels in the curved waveguide 12, light conceptually propagates so that the edge of the mode of light gets close to the left side with respect to the light propagation direction so as to be in contact with the side surface of the outer groove 21.

Thus, to design the outer groove 21, the position of the outer groove 21 is calculated and formed so that, when the edge of the mode of light that propagates in the curved waveguide 12 is in contact with the side surface of the outer groove 21, the optical axis of light that propagates in the straight waveguide 11 does not mismatch at a coupling portion with the optical axis of light that propagates in the curved waveguide 12. For example, the above described FIG. 6 is a case in which the outer groove 21 is positioned in conformity with the design.

On the other hand, as illustrated in FIG. 8, in the existing folded waveguide with no inner groove 22, when the space between the folded waveguide 10 and the outer groove 21 is larger than a designed value due to a manufacturing error, as in the case in which the space between the folded waveguide 10 and the outer groove 21 conforms to a designed value, the center of the straight waveguide 11 coincides with the center of light and, therefore, there is no change in light that propagates in the straight waveguide 11. On the other hand, the mode edge of light in the curved waveguide 12 propagates while being in contact with the side surface of the outer groove 21. Thus, when the space between the curved waveguide 12 and the outer groove 21 is larger than a predetermined value, light that travels in the curved waveguide 12 propagates while getting close to the left side with respect to the light propagation direction as compared with the case illustrated in FIG. 6. For this reason, there occurs a mismatch between the optical axis of light when propagating in the straight waveguide 11 and the optical axis of light when propagating in the curved waveguide 12 and, therefore, a radiation loss increases.

Figure 9:
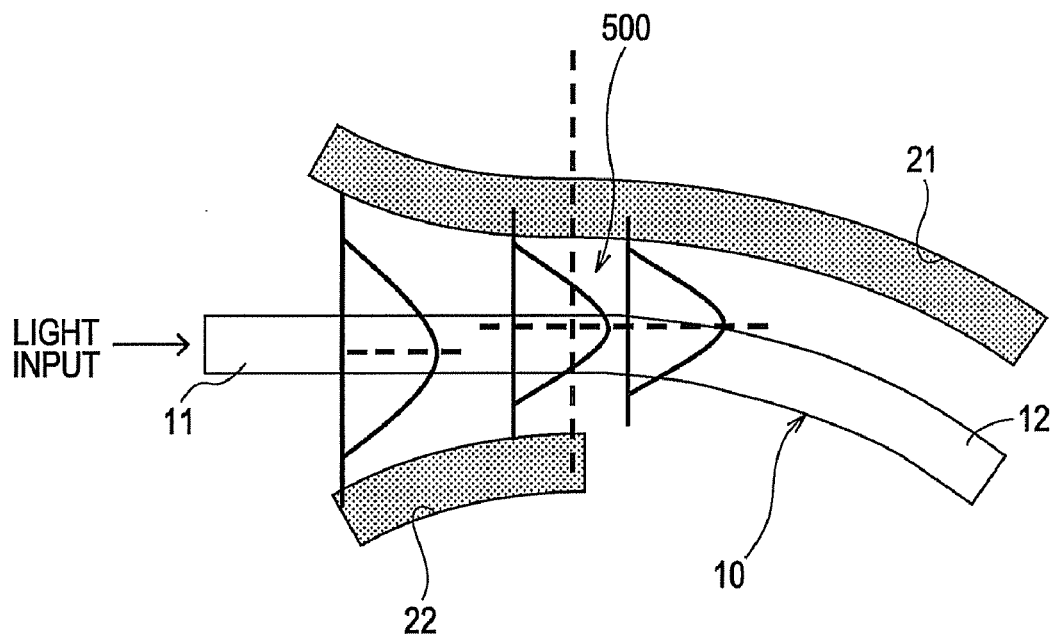
FIG. 9 is a view that illustrates a state where an inner groove is formed and there is a deviation in distance between the folded waveguide and the outer groove.

FIG. 9 is a view that illustrates a state where there is a deviation in distance between the folded waveguide 10 and the outer groove 21 in the folded waveguide having the inner groove 22, which is, for example illustrated in FIG. 1. FIG. 9 illustrates a state where the space between the folded waveguide 10 and the outer groove 21 is larger than a designed value.

Light that travels in the straight waveguide 11 toward the coupling portion 500 is guided by the inner groove 22 and is then distributed along the side surface of the outer groove 21. That is, light that travels in the straight waveguide 11 toward the coupling portion propagates so as to be pushed upward to the left side with respect to the light propagation direction (upward in FIG. 9) because of the inner groove 22.

Light that propagates in the curved waveguide 12 propagates along the outer groove 21 side. Because the inner groove 22 is provided at the position illustrated in FIG. 9, light that propagates in the straight waveguide 11 also gets close to the outer groove 21 side. Thus, it is possible to correct a deviation in optical axis at the coupling portion and, as a result, it is possible to reduce a radiation loss.

(3) State where the outer groove 21 is located near the folded waveguide 10 (when there is a manufacturing error)

Figure 10:
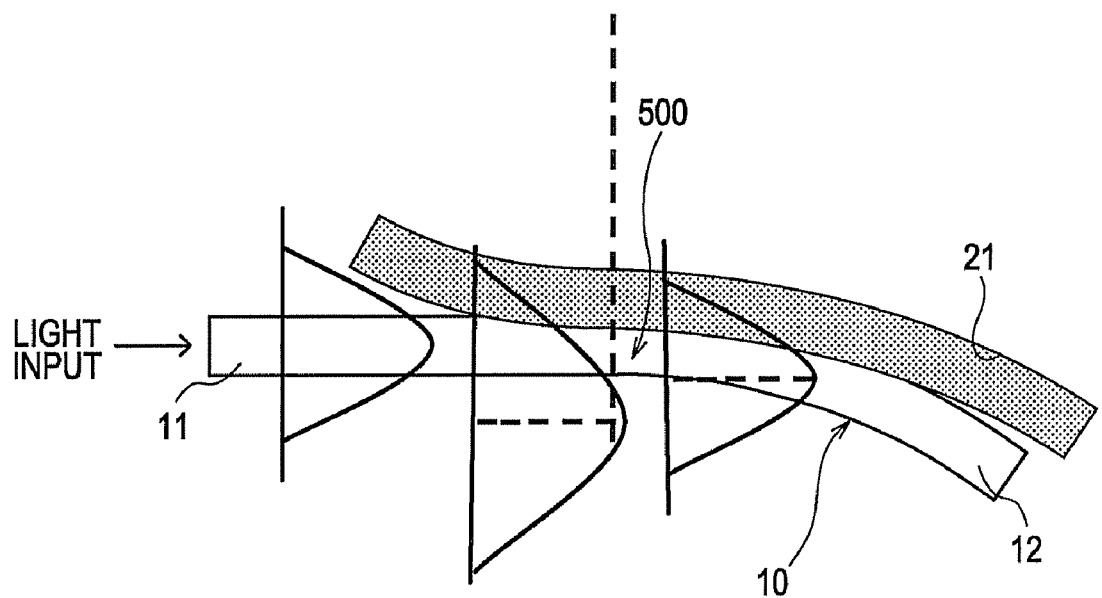
FIG. 10 is a view that illustrates a state where no inner groove is formed and there is a deviation in distance between the folded waveguide and the outer groove.

FIG. 10 is a view that illustrates a state where there is a deviation in distance between the folded waveguide 10 and the outer groove 21 and the space between the folded waveguide 10 and the outer groove 21 is smaller than a designed value in the existing folded waveguide with no inner groove 22, which is, for example, illustrated in FIG. 31.

As illustrated in FIG. 10, when portion of the folded waveguide 10 is cut by the outer groove 21 and the width of the waveguide is narrow, confinement of light becomes weak at the narrow portion. The influence of the weak confinement is particularly remarkable in the straight waveguide, and the mode field diameter of light in the straight waveguide 11 largely increases. In contrast, in the curved waveguide 12, because the influence of confinement with the outer groove 21 is large, a change in mode field diameter of light is small. Note that the mode field diameter will be described later with reference to FIG. 15.

Thus, the mode field diameter of light that propagates in the straight waveguide 11 differs from the mode field diameter of light that propagates in the curved waveguide 12, and there occurs a mismatch in optical axis and, as a result, a radiation loss increases.

Figure 11:
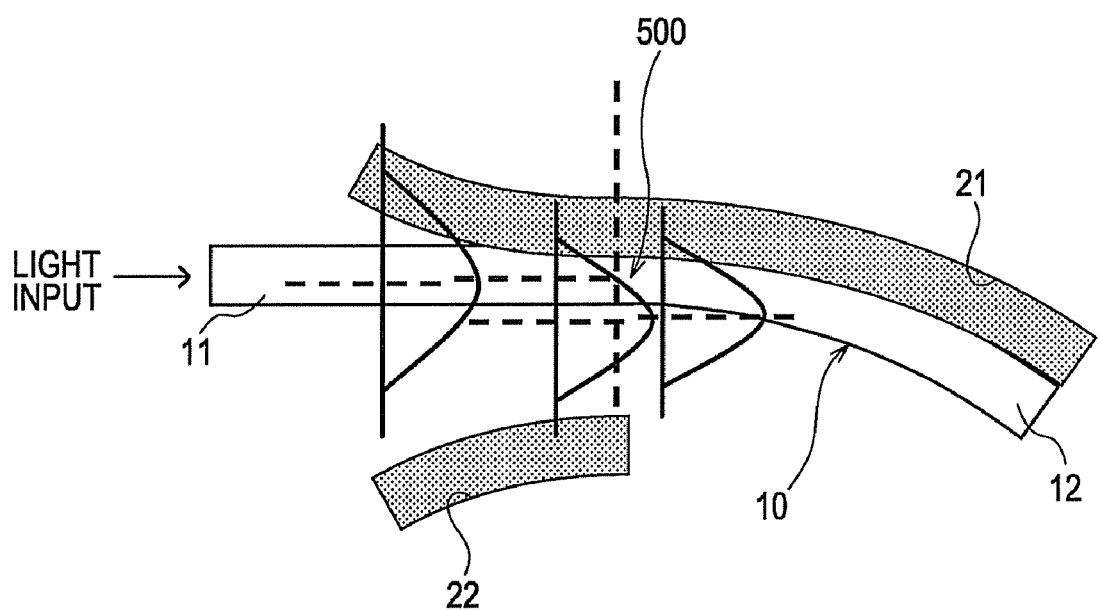
FIG. 11 is a view that illustrates a state where an inner groove is formed and there is a deviation in distance between the folded waveguide and the outer groove.

FIG. 11 illustrates a state where there is a deviation in distance between the folded waveguide 10 and the outer groove 21 and the space between the folded waveguide 10 and the outer groove 21 is smaller than a designed value in the folded waveguide with the inner groove 22, which is, for example, illustrated in FIG. 1.

When the inner groove 22 is located at the position illustrated in FIG. 11, it is possible to suppress an increase in mode field diameter of light that travels in the straight waveguide 11. Thus, the optical axis of light that propagates in the straight waveguide 11 coincides with the optical axis of light that propagates in the curved waveguide 12 and, as a result, a radiation loss may be reduced.

Figure 12:
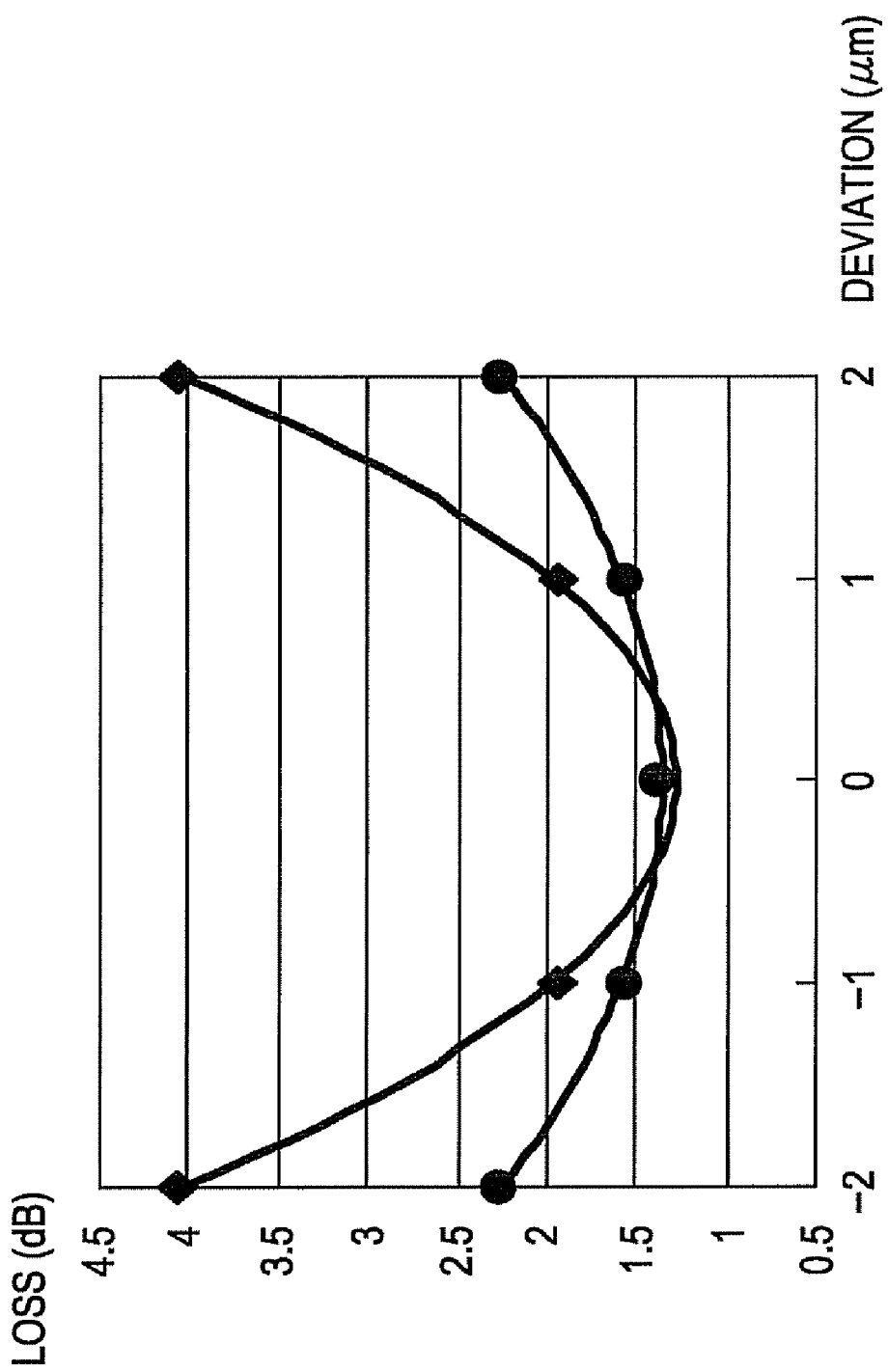
FIG. 12 is a graph that illustrates an increase in radiation loss which occurs in response to a deviation in distance between the folded waveguide and the outer groove.

FIG. 12 is a graph that illustrates the relationship between a deviation in position of the outer groove 21 with respect to the folded waveguide 10 and a radiation loss. The ordinate axis represents a loss (dB), and the abscissa axis represents a deviation (μm) of the outer groove 21. In the folded waveguide provided with the inner groove 22, which is, for example, illustrated in FIG. 1, even when there is a deviation in distance between the folded waveguide 10 and the outer groove 21, a radiation loss is reduced and, therefore, an increase in radiation loss is suppressed.

As described above, with the optical waveguide device 1 according to the present embodiment, the outer groove 21 is provided on the outer peripheral side of the folded waveguide 10, and the inner groove 22 is provided on the inner peripheral side of the folded waveguide 10 adjacent to the coupling portion between the straight waveguide 11 and the curved waveguide 12. Thus, the light input side and light output side of the folded waveguide 10 each have a ridge structure.

With the above configuration, even when the optical waveguide device is manufactured so that the position of the outer groove 21 is deviated with respect to the folded waveguide 10, it is possible to prevent an increase in radiation loss and, therefore, it is possible to increase a tolerance for an error that occurs in a manufacturing process. That is, by preventing a loss due to an error, it is possible to implement high-quality optical communication.

Next, the feature in terms of manufacturing the optical waveguide device 1 or the feature in terms of configuration of the optical waveguide device 1 will be described in the following (a1) to (g1).

(a1) When the outer groove 21 and the inner groove 22 are formed on the substrate 30 (Z-cut LN substrate), the optical waveguide (including the folded waveguide 10) is formed on the surface of the substrate 30, then the outer groove 21 and the inner groove 22 are formed on the substrate 30 by way of dry etching, or the like, and, after that, the buffer layer 40 is provided.

In addition, in order to reduce a radiation loss, it is desired to employ a manufacturing method that provides a small propagation loss of the optical waveguide and strong confinement. Then, the optical waveguide is formed by way of Ti diffusion or proton exchange.

(b1) In order to increase the horizontal confinement of light with the ridge, the refractive indices of both sides of the ridge need to be small. In addition, the width of the ridge needs to be reduced to some extent in order to reduce the mode field diameter. However, when the width of the ridge is excessively reduced, there is a possibility that the stress applied to the side surfaces of the ridge may exert an influence.

Then, gas is provided on both sides of the ridge around the coupling portion between the straight waveguide 11 and the curved waveguide 12. The gas may employ air or N2 gas. Specifically, it is only necessary to manufacture an optical module that incorporates the optical waveguide device 1 by filling the inside of the module with air or N2 gas.

Because gas such as air or N2 gas has a low refractive index, it is possible to contribute to enhancing horizontal confinement of light with the ridge. In addition, even when the width of the ridge is narrow, it is possible to reduce the influence due to the stress owing to the pressure at which gas is filled.

(c1) The buffer layer 40 is able to suppress a scattering loss when the thickness is large or the refractive index is close to that of LN. However, at the same time, confinement of light weakens. As a result, a radiation loss in the curved waveguide 12 increases. In addition, because the scattering loss increases at a position at which the curved waveguide 12 is close to the outer groove 21, the scattering loss increases around the coupling portion between the straight waveguide 11 and the curved waveguide 12.

Figure 13:
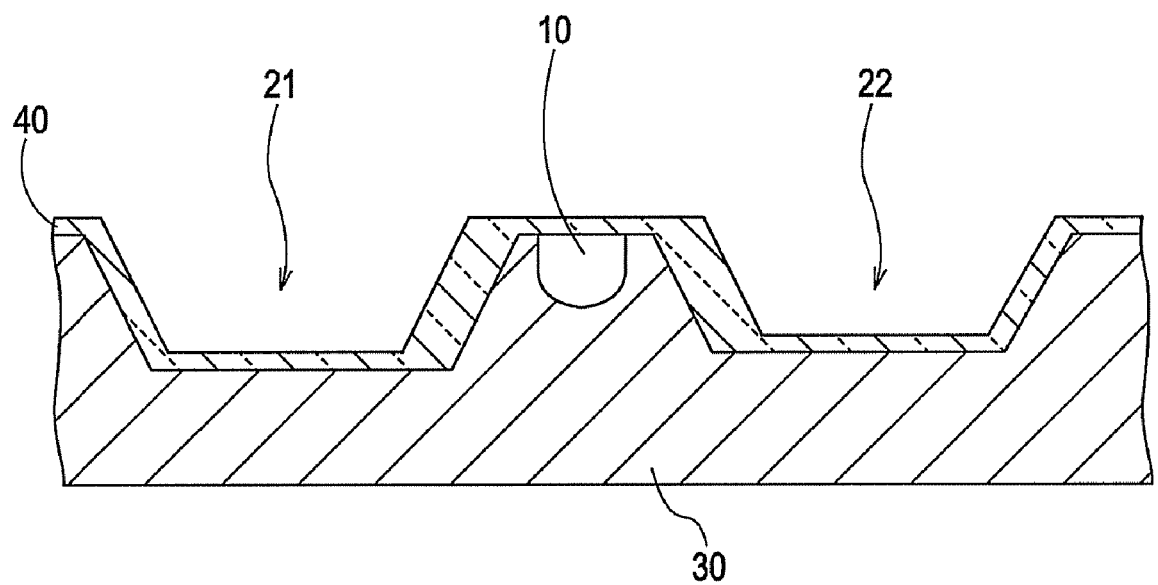
FIG. 13 is a view that illustrates a state where the thickness of a buffer layer on the side surfaces of a ridge is increased.

Then, the thickness of the buffer layer 40 on the side surfaces of the ridge is increased only around the coupling portion between the straight waveguide 11 and the curved waveguide 12. In addition, the refractive index of the buffer layer 40 on the side surfaces of the ridge is increased only around the coupling portion between the straight waveguide 11 and the curved waveguide 12. By so doing, a scattering loss around the coupling portion is suppressed. FIG. 13 illustrates a state where the thickness of the buffer layer 40 on the side surfaces of the ridge is increased.

Figure 14:
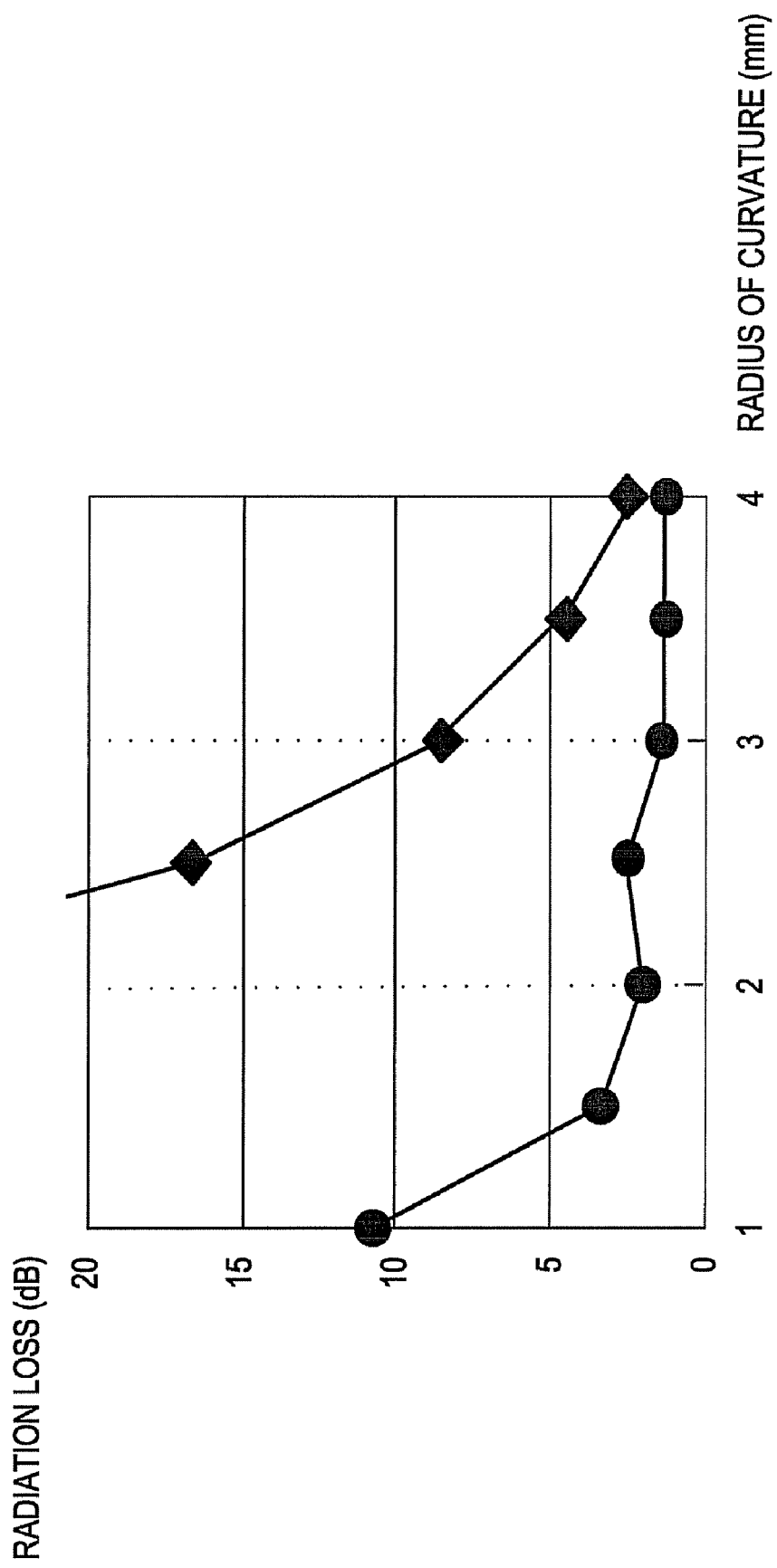
FIG. 14 is a graph that illustrates the relationship between a radius of curvature and a radiation loss.

(d1) FIG. 14 is a graph that illustrates the relationship between a radius of curvature and a radiation loss. The ordinate axis represents a radiation loss dB, and the abscissa axis represents a radius of curvature mm. FIG. 14 illustrates a radiation loss when a radius of curvature of the curved waveguide 12 changes in the case where no outer groove 21 is provided and a radiation loss when a radius of curvature of the curved waveguide 12 changes in the case where the outer groove 21 is provided.

It is understood from FIG. 14 that, when the radius of curvature is smaller than or equal to 4 mm, the radiation loss when the outer groove 21 is provided is smaller than the radiation loss when no outer groove 21 is provided, and the effect of reducing a radiation loss owing to the outer groove 21 appears at a radius of curvature smaller than or equal to 4 mm. Note that, when the radius of curvature is larger than or equal to 4 mm, the scattering loss occurs due to roughness of the side surfaces of the groove, or the like, and, therefore, a loss may increase on the contrary.

That is, where the radius of curvature of the curved waveguide 12 is R, when R≦4 mm, the outer groove 21 is necessary, whereas when R>4 mm, the outer groove 21 is unnecessary. Thus, the folded waveguide 10 of the optical waveguide device 1 is manufactured so that the radius of curvature of the curved waveguide 12 is smaller than or equal to 4 mm and the radius of curvature of the straight waveguide 11 exceeds 4 mm.

Figure 15:
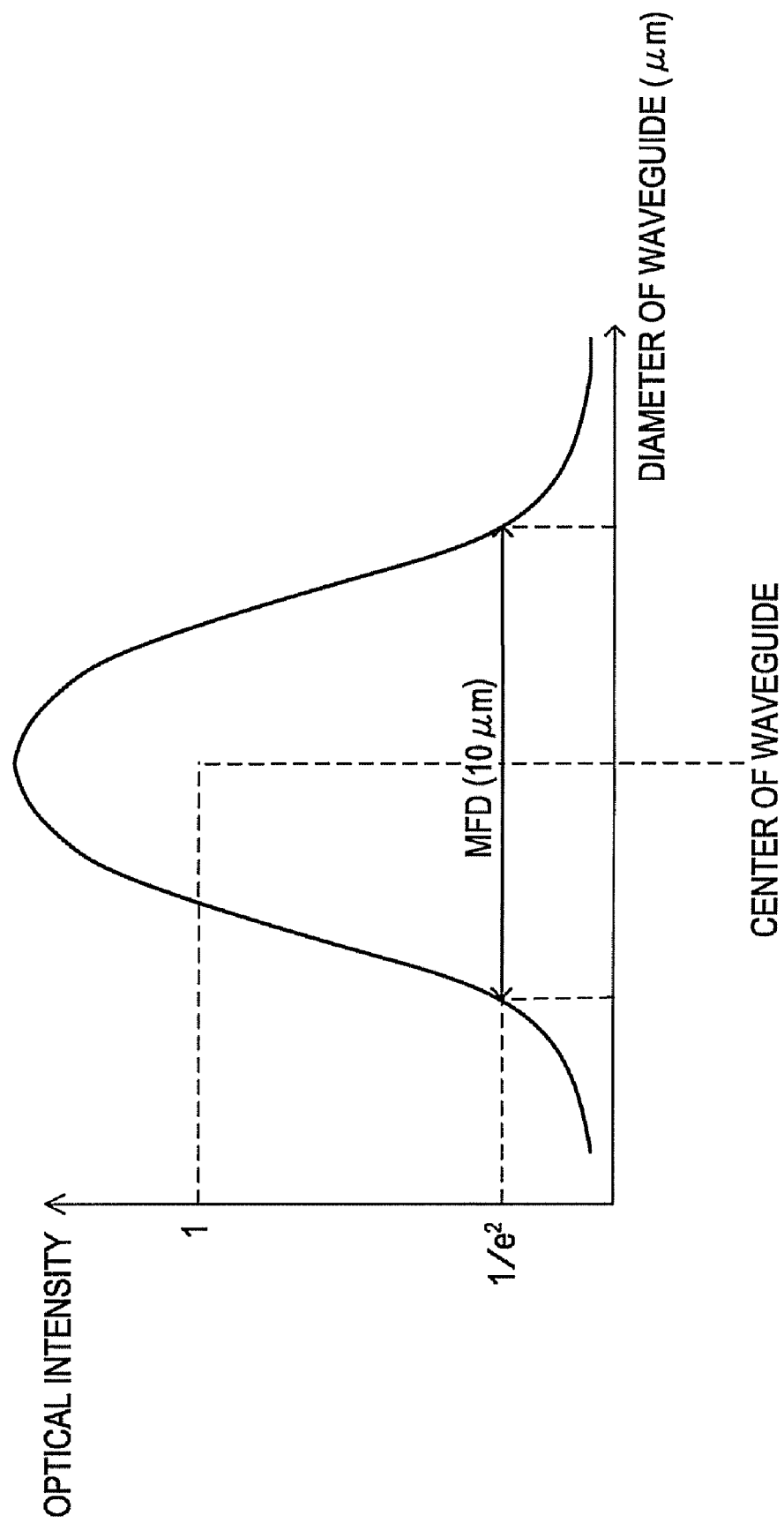
FIG. 15 is a graph that illustrates a mode field diameter.

(e1) The mode field diameter (MFD) of light is smaller than about 10 μm at the coupling portion between the straight waveguide 11 and the curved waveguide 12. FIG. 15 is a graph that illustrates a mode field diameter. The ordinate axis represents an optical intensity, and the abscissa axis represents a diameter of the waveguide (waveguide diameter).

Signal light propagates as a spread of emitted light. The MFD is an index that indicates the degree of spread of light distribution with respect to a waveguide diameter. The optical intensity distribution forms a Gaussian distribution curve, in which the center of the waveguide is the highest in optical intensity, and the optical intensity decreases toward the outer peripheral of the waveguide.

In the above curve, when the maximum optical intensity is set to 1, a waveguide diameter at $1/e^2$ (e is a base of natural logarithm (=2.718 . . . )) (about 13.5%) with respect to the maximum value 1 of the center of the waveguide is generally defined as a mode field diameter.

Figure 16:
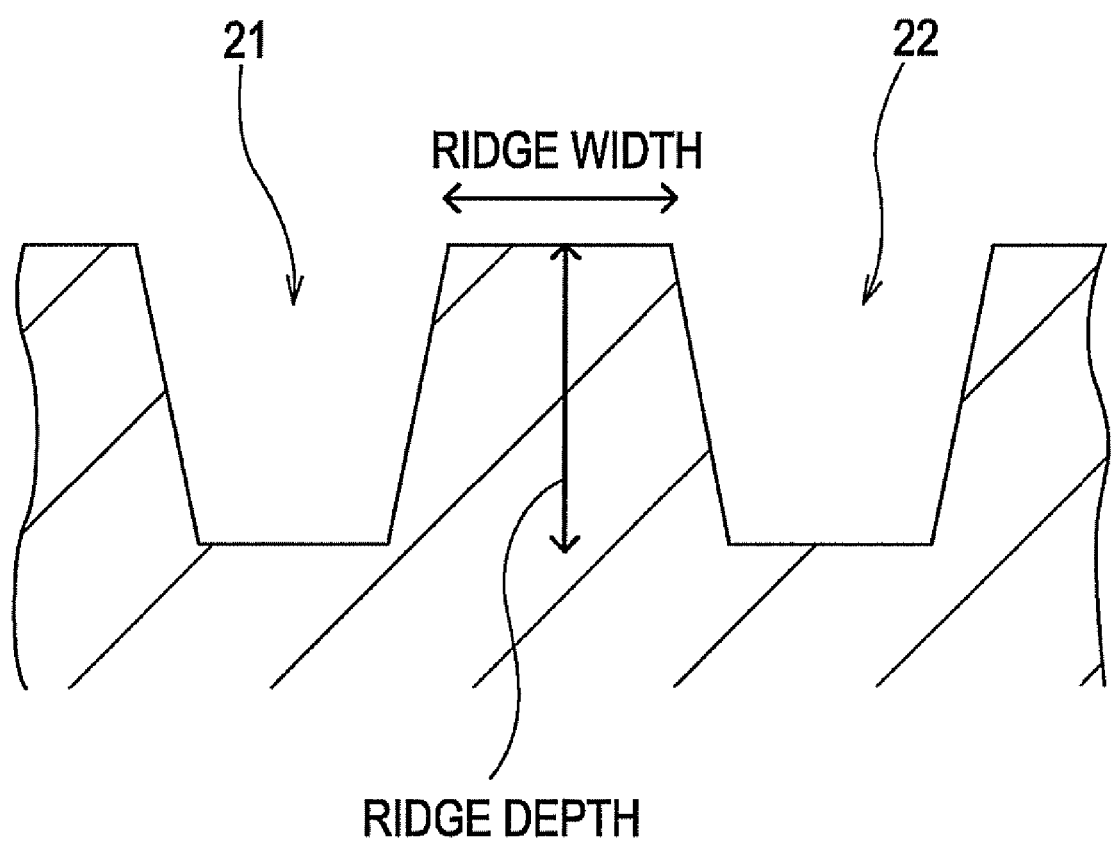
FIG. 16 is a view that illustrates the width of a ridge and the depth of the ridge.

On the other hand, the peak of an optical power in the vertical direction (substrate depth direction) of the coupling portion between the straight waveguide 11 and the curved waveguide 12 is located about 3 μm below the substrate surface (ridge upper surface). Then, at the coupling portion between the straight waveguide 11 and the curved waveguide 12, the width of the ridge is smaller than or equal to 10 μm, and the depth of the ridge is smaller than or equal to 3 μm. FIG. 16 illustrates the width of the ridge and the depth of the ridge.

(f1) The curved waveguide 12 has a small radius of curvature, so confinement of light is weak. At this time, because the mode field diameter of light expands, there occurs a mode mismatch with the straight waveguide 11. To prevent this situation, the width of the curved waveguide 12 is formed so as to be larger than the width of the straight waveguide 11 around the coupling portion between the straight waveguide 11 and the curved waveguide 12.

(g1) Because both sides are grooves around the coupling portion between the straight waveguide 11 and the curved waveguide 12, confinement of light is strong, thus becoming a multi-mode waveguide. When zero-order mode light is coupled to a higher mode, it causes a loss when recoupled to a single mode waveguide. Then, it is formed so that a distance from the straight waveguide 11 to the outer groove 21 is equal to a distance from the straight waveguide 11 to the inner groove 22 (it is formed so that the outer groove 21 and the inner groove 22 are symmetrical with respect to the straight waveguide 11).

That is, as described with reference to FIG. 2A and FIG. 2B, the shapes of the outer groove 21 and light input side inner groove 22a are tapered so that the space B1 between the straight waveguide 11 and the outer groove 21 and the space B2 between the straight waveguide 11 and the input-side inner groove 22a are continuously narrowed in the light propagation direction around the light input side coupling portion. At this time, the spaces B1 and B2 are formed so as to be equal and symmetrical.

Similarly, as described with reference to FIG. 4A and FIG. 4B, the shapes of the outer groove 21 and light output side inner groove 22b are tapered so that the space B3 between the straight waveguide 11 and the outer groove 21 and the space B4 between the straight waveguide 11 and the output-side inner groove 22b are continuously widened in the light propagation direction around the light output side coupling portion. At this time, the spaces B3 and B4 are formed so as to be equal and symmetrical. With the above configuration, the symmetry of light that propagates in the straight waveguide 11 becomes favorable, and it is possible to prevent an occurrence of excitation of a higher mode.

Next, as alternative embodiments of the optical waveguide device 1, alternative embodiments (a2) to (d2) will be described below.

Figure 17:
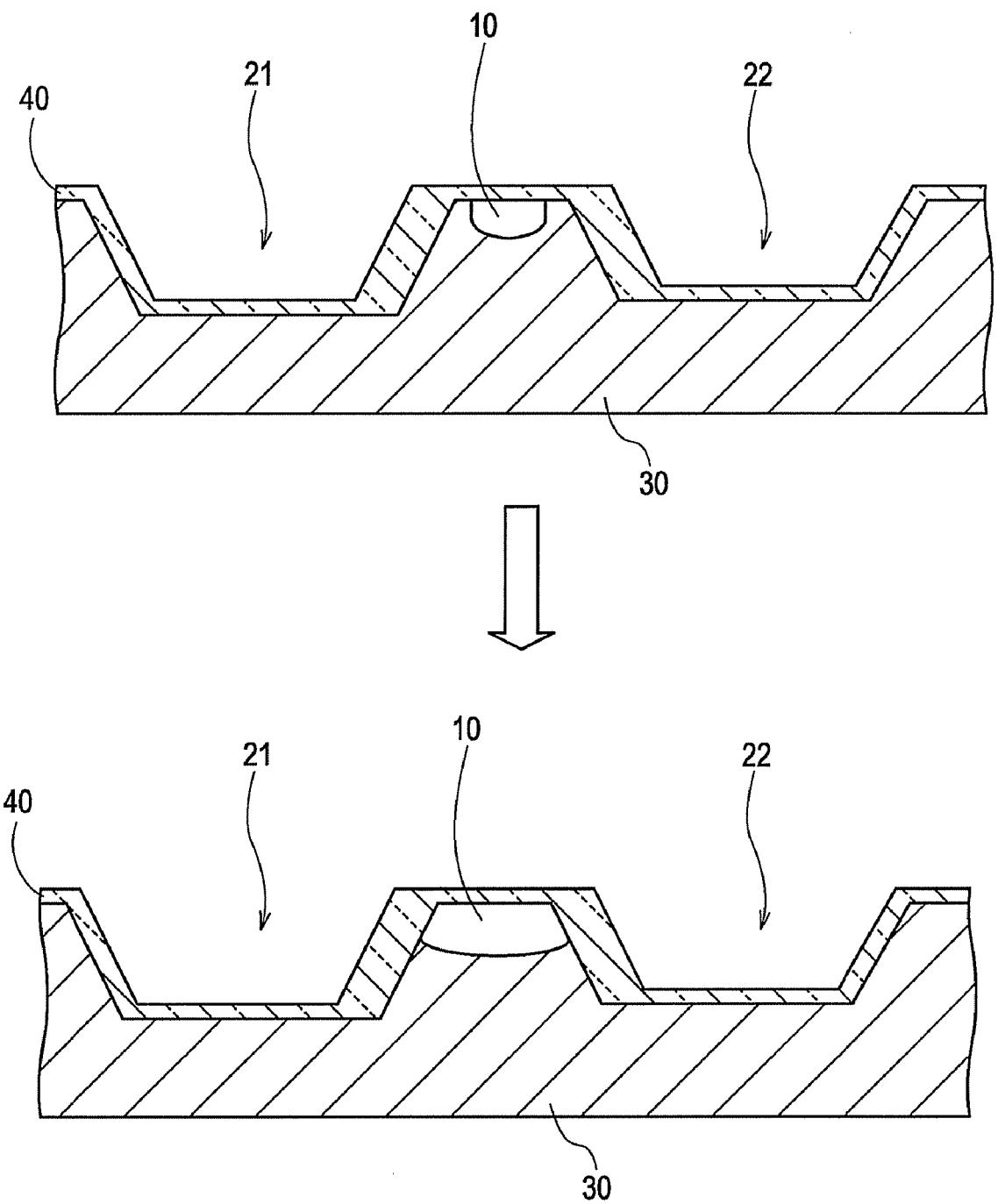
FIG. 17 is a cross-sectional view of the coupling portion when the entire upper portion of the ridge is used as the optical waveguide.

(a2) FIG. 17 is a cross-sectional view of the coupling portion in which the entire upper portion of the ridge is formed as an optical waveguide. In the cross section around the coupling portion between the straight waveguide 11 and the curved waveguide 12, the entire upper portion of the ridge is formed as the optical waveguide (folded waveguide 10).

With the above shape, it is possible to increase a tolerance for a positional deviation between the outer groove 21 and the folded waveguide 10. When the width of the optical waveguide is larger than the width of the ridge at the coupling portion between the straight waveguide 11 and the curved waveguide 12, the entire inner portion of the ridge forms a waveguide region. Therefore, even when the position of the outer groove 21 deviates a little, a distribution in refractive index inside the ridge does not change.

(b2) The curved waveguide 12 is formed so as to be in contact with the outer groove 21. Thus, it is possible to further increase a tolerance for a deviation in distance between the outer groove 21 and the curved waveguide 12.

Figure 18:
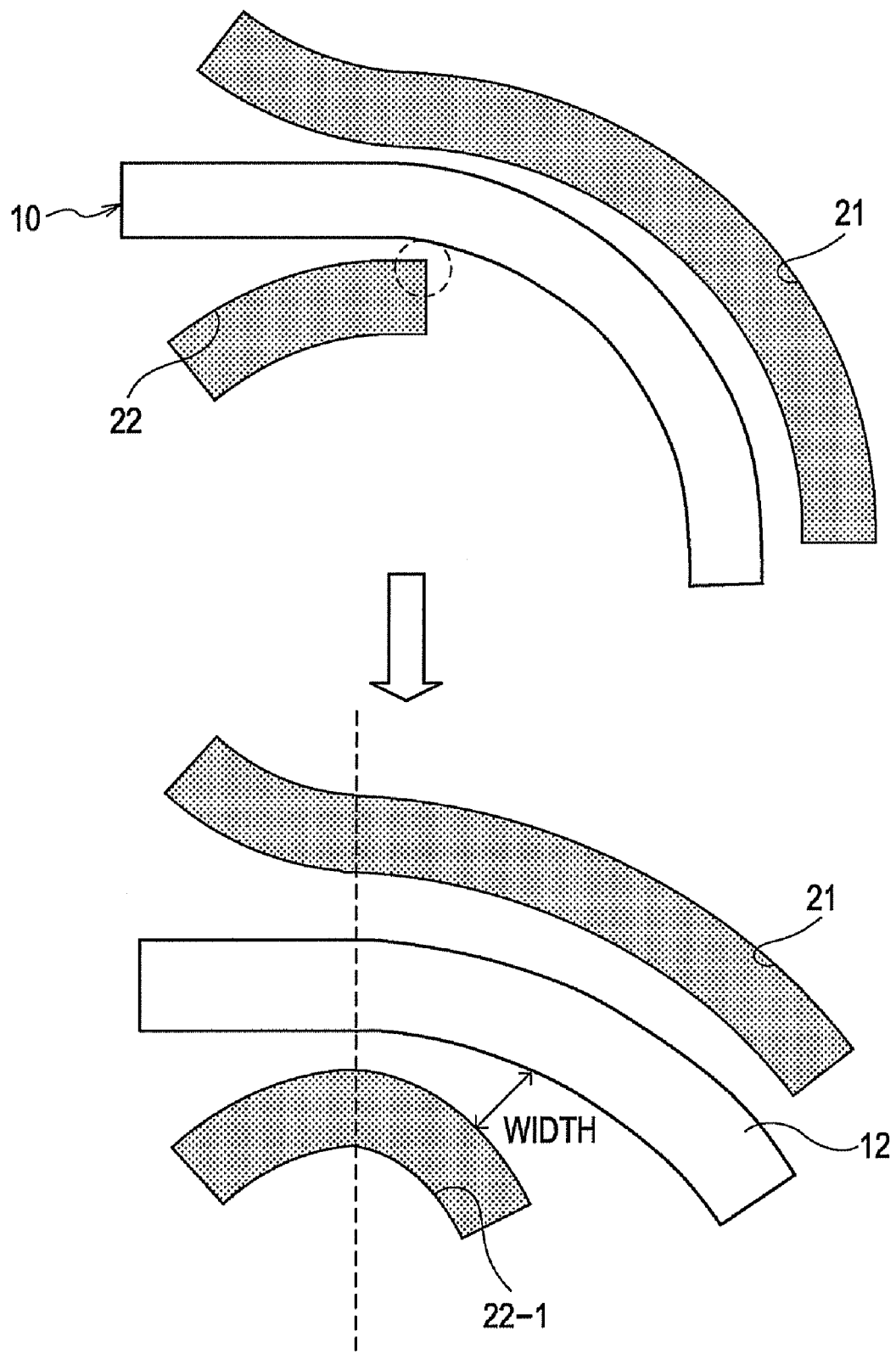
FIG. 18 is a view that illustrates an elongated inner groove.

(c2) FIG. 18 is a view that illustrates an elongated inner groove. In the above described inner groove 22, there is a possibility that a scattering loss may occur due to the corner of the inner groove 22. To prevent this situation, the inner groove 22 elongates toward the inner peripheral side of the curved waveguide 12 to form an elongated inner groove 22-1, which is an elongated portion, and a distance (width) from the inner periphery of the curved waveguide 12 to the outer periphery of the elongated inner groove 22-1 is formed to continuously vary.

That is, when in the light input side, the width from the inner periphery of the curved waveguide 12 to the outer periphery of the elongated inner groove is formed to be continuously widened in the light propagation direction, while when in the light output side, the width from the inner periphery of the curved waveguide 12 to the outer periphery of the elongated inner groove is formed to be continuously narrowed in the light propagation direction.

Here, when the radius of the outer periphery of the elongated inner groove 22-1 is too small as compared with the radius of the inner periphery of the curved waveguide 12, the advantageous effect of the elongated inner groove 22-1 cannot be obtained, whereas when it is too large, a scattering loss due to roughness of the side surfaces of the elongated inner groove 22-1 increases a radiation loss.

Figure 19:
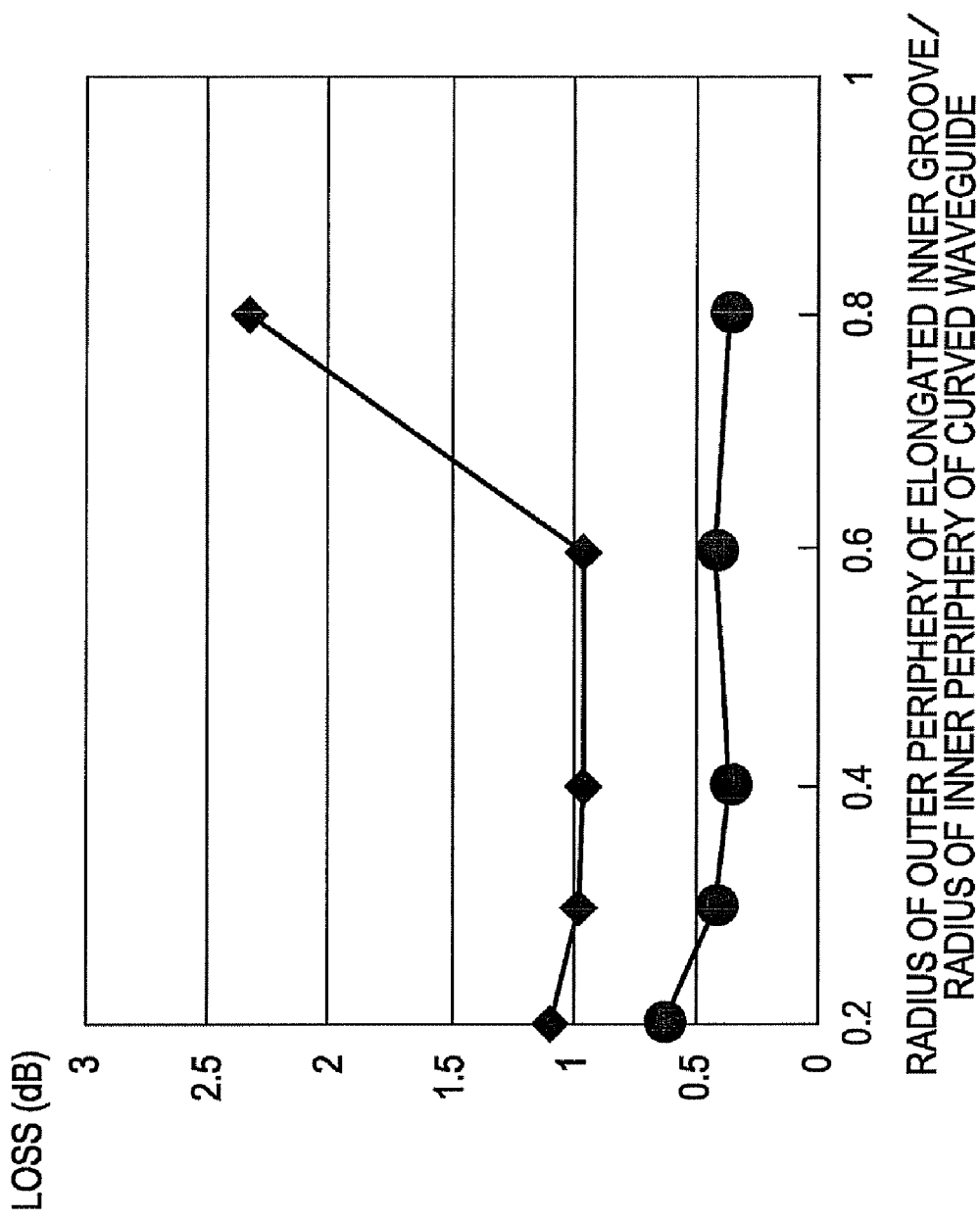
FIG. 19 is a graph that illustrates the influence of a ratio of the radius of the outer periphery of the elongated inner groove to the radius of the inner periphery of the curved waveguide on a loss.

FIG. 19 is a graph that illustrates the influence of a ratio of the radius of the outer periphery of the elongated inner groove 22-1 to the radius of the inner periphery of the curved waveguide 12 on a loss. FIG. 19 illustrates a loss of the curved waveguide 12 for two cases, that is, when the distance of the outer groove 21 to the folded waveguide 10 conforms to a design value (positional deviation is 0) and when the distance is deviated by 1.5 μm from the designed value (positional deviation is 1.5 μm). The ordinate axis represents a loss dB of the curved waveguide 12, and the abscissa axis represents a ratio of the radius of the outer periphery of the elongated inner groove 22-1 to the radius of the inner periphery of the curved waveguide 12 (radius of the outer periphery of the elongated inner groove 22-1/radius of the inner periphery of the curved waveguide 12).

It appears that, in the case where the positional deviation is 0, a loss increases when the ratio (radius of the outer periphery of the elongated inner groove 22-1/radius of the inner periphery of the curved waveguide 12) is smaller than 0.3, whereas in the case where the positional deviation is 1.5 μm, a loss increases when the ratio is larger than or equal to 0.6. From the above relationship, it is desirable that the radius of the outer periphery of the elongated inner groove 22-1 that elongates toward the inner peripheral side of the curved waveguide 12 is 30% to 60% of the radius of the inner periphery of the curved waveguide 12.

Figure 20:
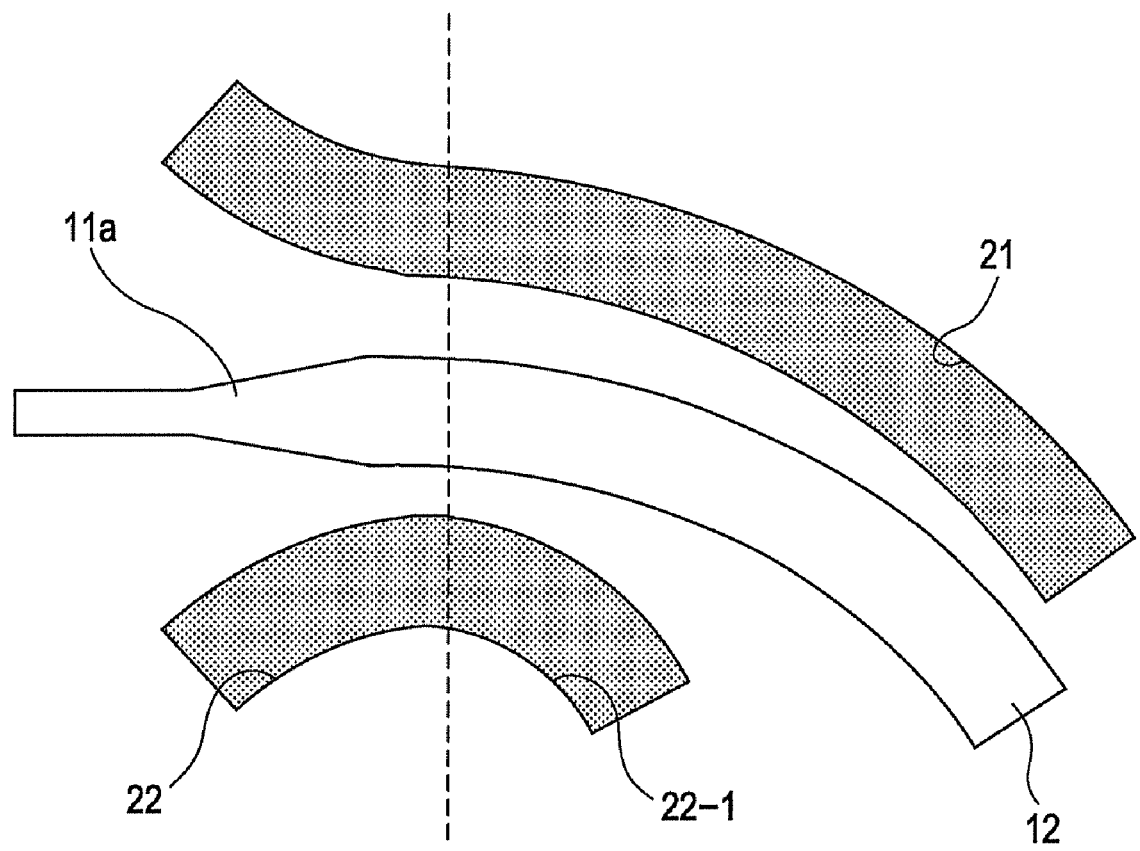
FIG. 20 is a view that illustrates configuration in which the shape of the straight waveguide is tapered near the coupling portion.

(d2) FIG. 20 is a view that illustrates a configuration that the shape of the straight waveguide 11 is tapered around the coupling portion. The modes of light are designed to match around the coupling portion between the straight waveguide 11 and the curved waveguide 12. Thus, it may be necessary to change the width of the straight waveguide 11 between a portion around the coupling portion and a portion located at a distance from the coupling portion.

In this case, as illustrated in FIG. 20, the straight waveguide 11a is formed so that the width of the waveguide is varied taperingly toward the portion around the coupling portion in order to gradually increase the width of the waveguide as it gets close to the coupling portion. With the above configuration, it is possible to vary the width of the waveguide without an increase in loss.

Figure 29:
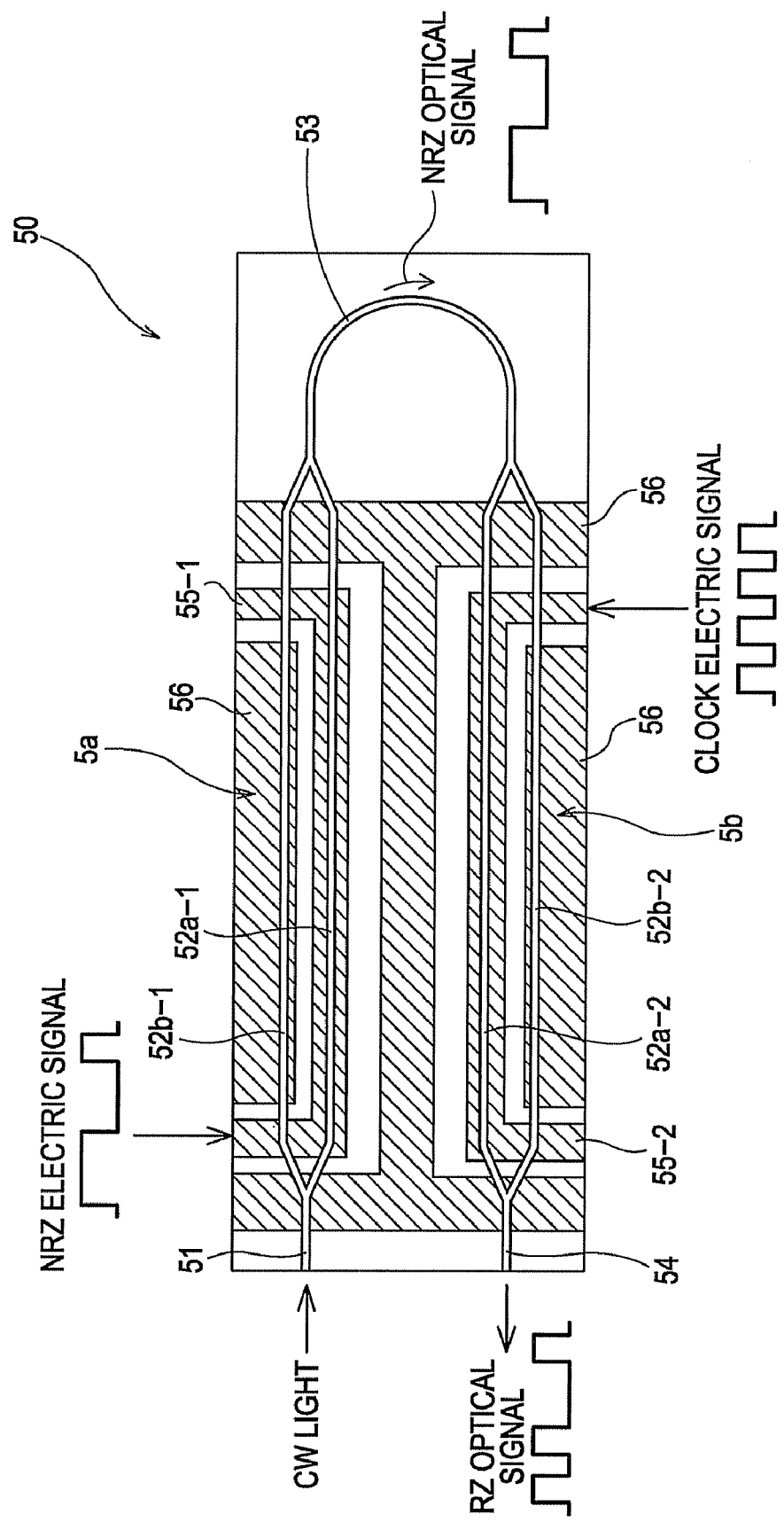
FIG. 29 is a view that illustrates an RZ modulator.
Figure 30:
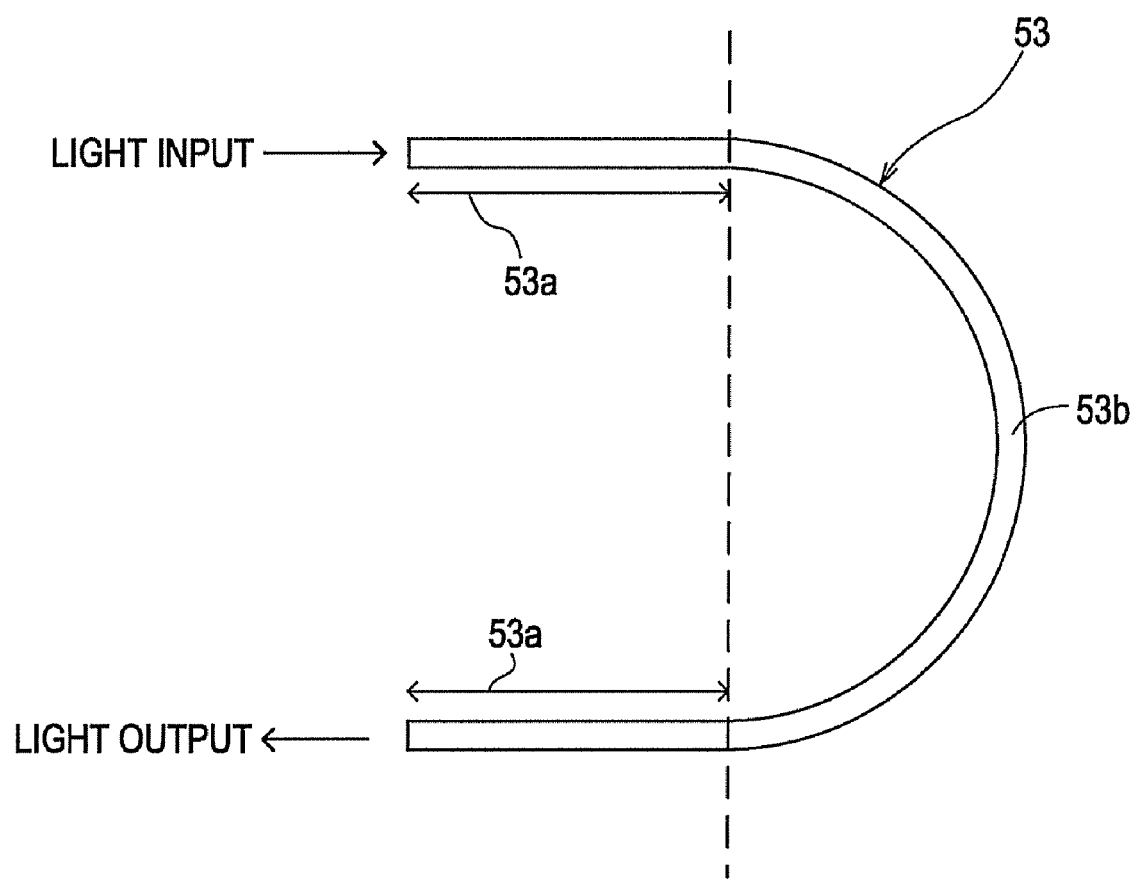
FIG. 30 is a view that illustrates a folded waveguide.

Next, the optical modulator to which the optical waveguide device 1 is applied will be described. FIG. 21 is a view that illustrates the optical modulator. FIG. 21 illustrates the configuration that the configuration of the optical waveguide device 1 is applied to the RZ modulator, which is described with reference to FIG. 29. The optical modulator 3 is formed so that two Mach-Zehnder interferometer-type optical waveguides are coupled by the folded waveguide 10 on the substrate 30.

The optical waveguide is formed of the light input side Mach-Zehnder interferometer-type waveguide 3a, the folded waveguide 10 and the light output side Mach-Zehnder interferometer-type waveguide 3b. The light input side Mach-Zehnder interferometer-type waveguide 3a is formed of an input waveguide 31 and light input side concurrent waveguides 32a-1 and 32b-1. The folded waveguide 10 is formed of the straight waveguides 11 and the curved waveguide 12. The light output side Mach-Zehnder interferometer-type waveguide 3b is formed of light output side concurrent waveguides 32a-2 and 32b-2 and an output waveguide 34.

A signal electrode 35-1 is provided on the light input side concurrent waveguide 32a-1. A ground electrode 36 is provided on the light input side concurrent waveguide 32b-1. A signal electrode 35-2 is provided on the light output side concurrent waveguide 32a-2. The ground electrode 36 is provided on the light output side concurrent waveguide 32b-2.

The outer groove 21 is formed by recessing the substrate 30 along the outer periphery of the folded waveguide 10. The input-side inner groove 22a is provided on the inner peripheral of the straight waveguide 11, and is formed by recessing the substrate 30 around the light input side coupling portion between the straight waveguide 11 and the curved waveguide 12. The output-side inner groove 22b is provided on the inner peripheral of the straight waveguide 11, and is formed by recessing the substrate 30 around the light output side coupling portion between the straight waveguide 11 and the curved waveguide 12.

In this way, in the optical modulator 3, the outer groove 21, the input-side inner groove 22a and the output-side inner groove 22b are provided for the folded waveguide 10. Thus, even when the optical modulator 3 is manufactured so that an error occurs in the distance between the curved waveguide 12 and the outer groove 21 to deviate from a desired designed value, it is possible to suppress an increase in radiation loss and, therefore, it is possible to perform high-quality optical modulation.

Figure 22:
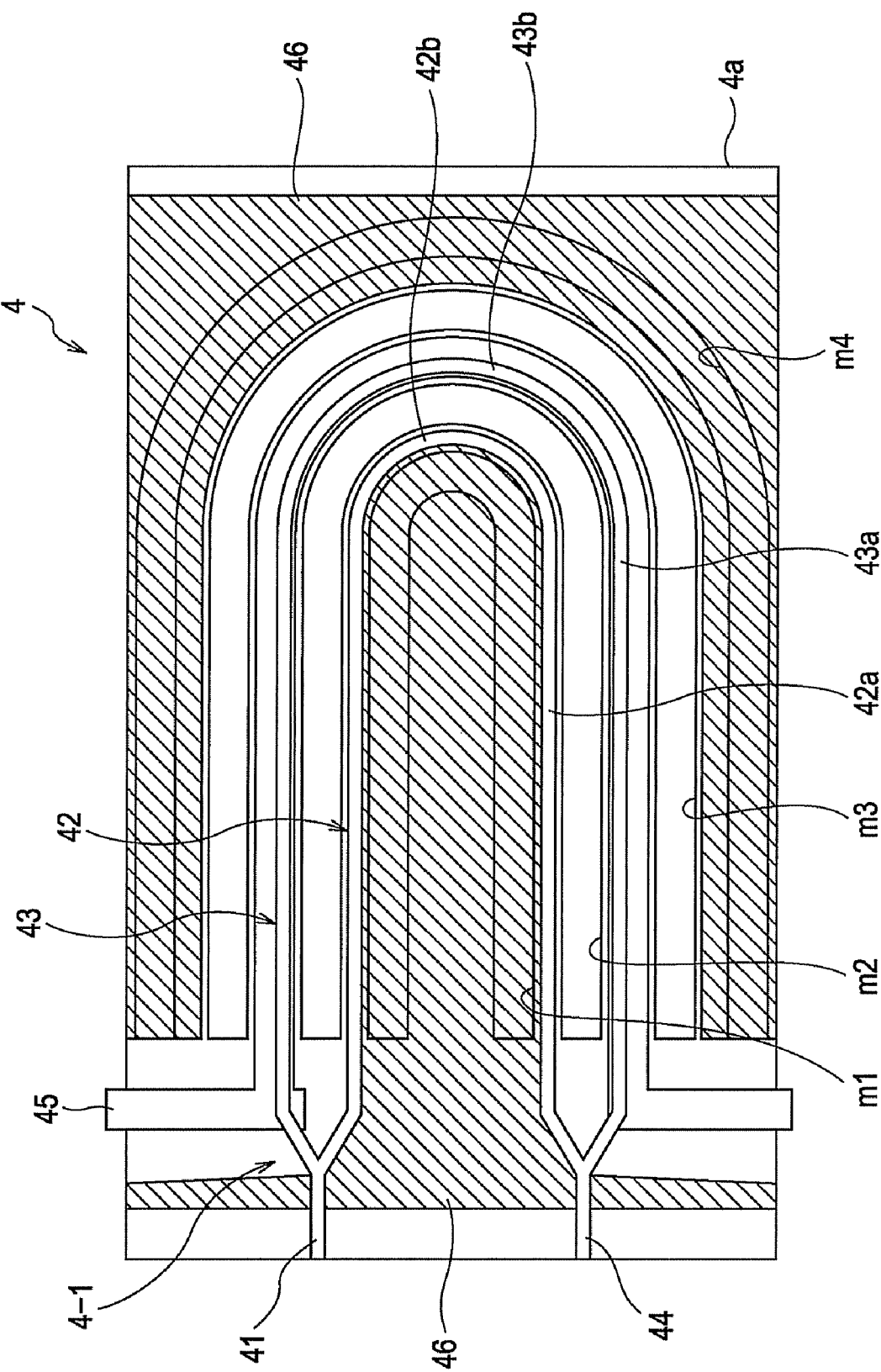
FIG. 22 is a view that illustrates an optical modulator.

FIG. 22 is a view that illustrates an optical modulator. The optical modulator 4 is a device that has a configuration that the optical waveguide of a single Mach-Zehnder modulator is folded. In the optical modulator 4, a Mach-Zehnder interferometer-type folded waveguide 4-1, a signal electrode 45, a ground electrode 46 and grooves m1 to m4 (first groove to fourth groove) are formed on the substrate 4a.

The Mach-Zehnder interferometer-type optical waveguide 4-1 is formed of an input waveguide 41, an inner waveguide 42, an outer waveguide 43, and an output waveguide 44. The input waveguide 41 is a waveguide that splits input light into two.

The inner waveguide 42 is formed of straight waveguides 42a and a curved waveguide 42b. The straight waveguides 42a are waveguides with a straight shape or a curved shape having a radius of curvature larger than or equal to a predetermined value. The curved waveguide 42b is a waveguide with a curved shape having a radius of curvature smaller than the straight waveguides 42a. The inner waveguide 42 is one of the two-branched waveguides, located at the inner peripheral.

The outer waveguide 43 is formed of straight waveguides 43a and a curved waveguide 43b, and is the other one of the waveguides, located at the outer peripheral. The output waveguide 44 is a waveguide that multiplexes light propagating in the inner waveguide 42 with light propagating in the outer waveguide 43, and outputs the multiplexed light.

The signal electrode 45 is provided on the outer waveguide 43. The ground electrode 46 is provided on both sides of the signal electrode 45. The groove m1 is formed by recessing the substrate 4a along the inner periphery of the inner waveguide 42. The groove m2 is formed by recessing the substrate 4a along the outer periphery of the inner waveguide 42 and the inner periphery of the outer waveguide 43. The groove m3 is formed by recessing the substrate 4a along the outer periphery of the outer waveguide 43. The groove m4 is formed by recessing the substrate 4a along the outer periphery of the groove m3.

Figure 23A:
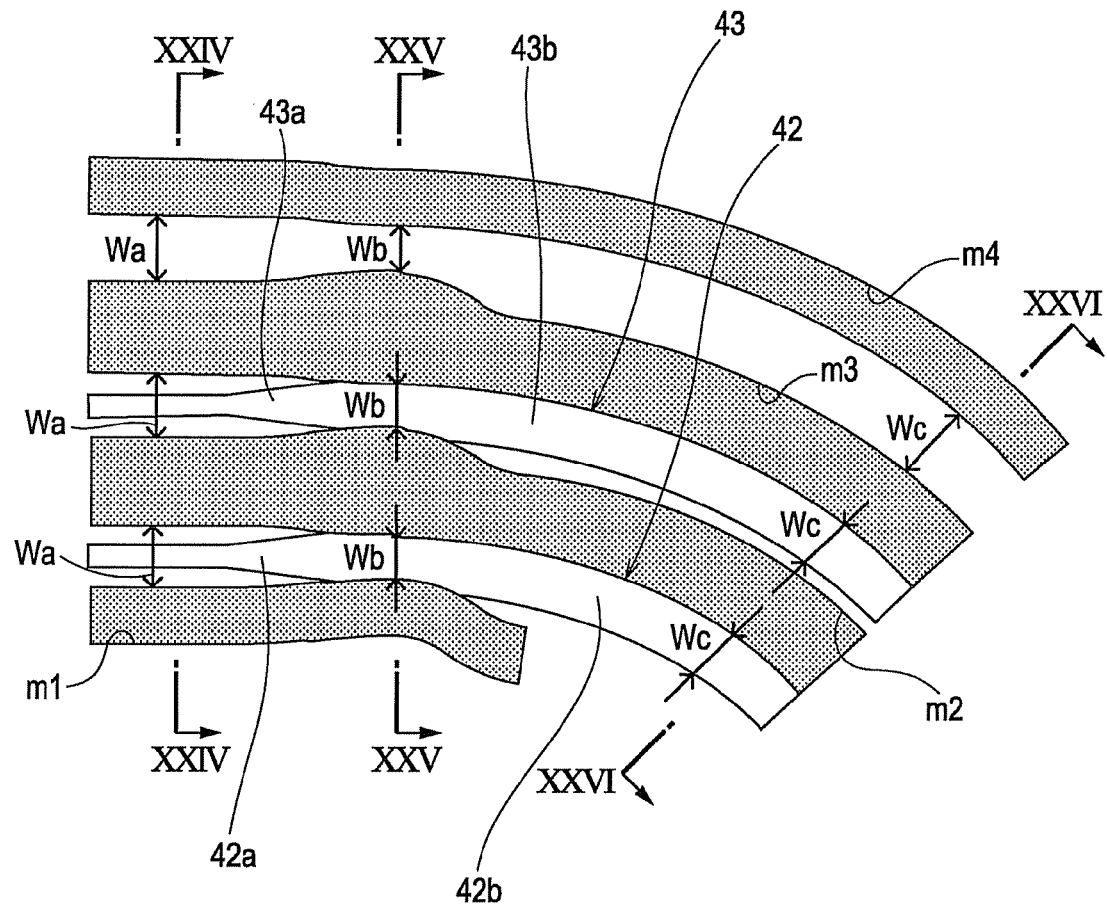
FIG. 23A and FIG. 23B are views that illustrate a portion around a coupling portion between a straight waveguide and a curved waveguide.
Figure 23B:
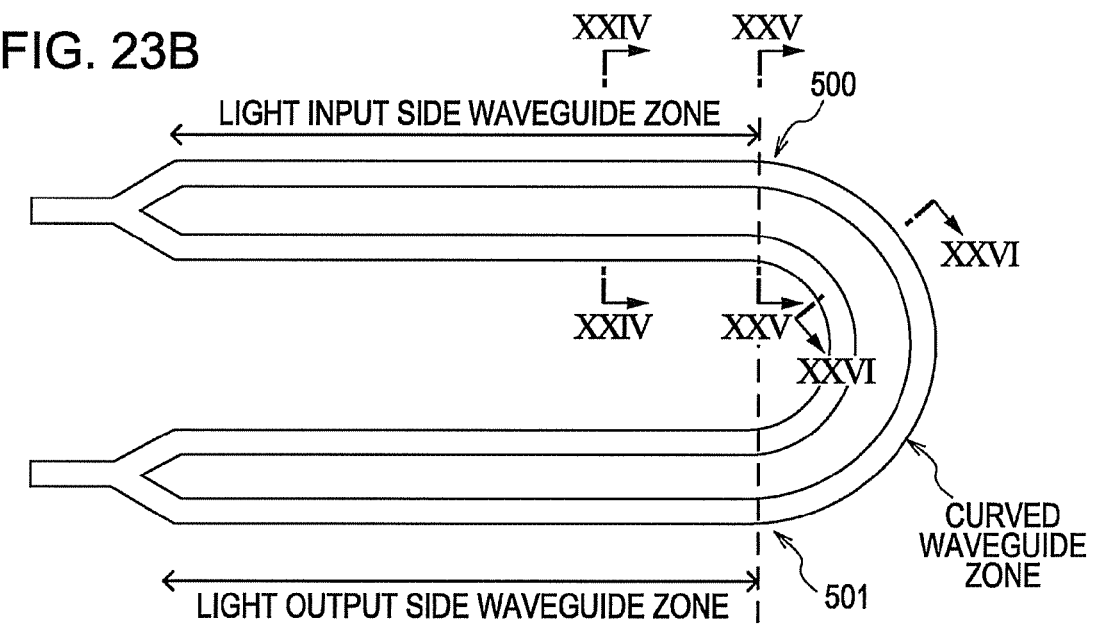

FIG. 23A and FIG. 23B are views that illustrate a portion around the coupling portion between the straight waveguide and the curved waveguide. FIG. 23A illustrates a portion around the coupling portion between the straight waveguide 42a and curved waveguide 42b of the inner waveguide 42 and a portion around the coupling portion between the straight waveguide 43a and curved waveguide 43b of the outer waveguide 43.

Figure 24:
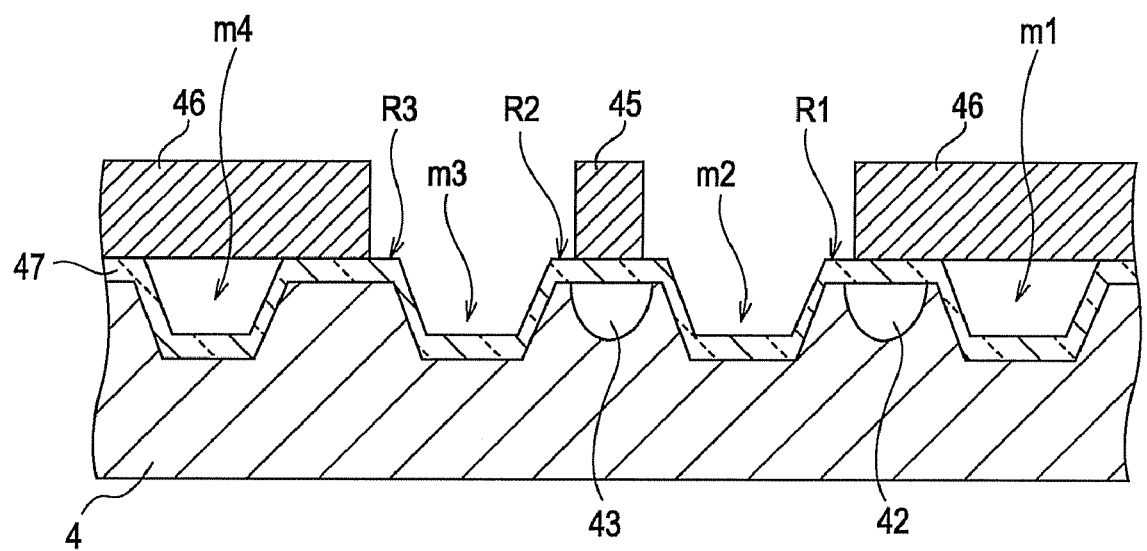
FIG. 24 is a cross-sectional view of the portion around the coupling portion.
Figure 25:
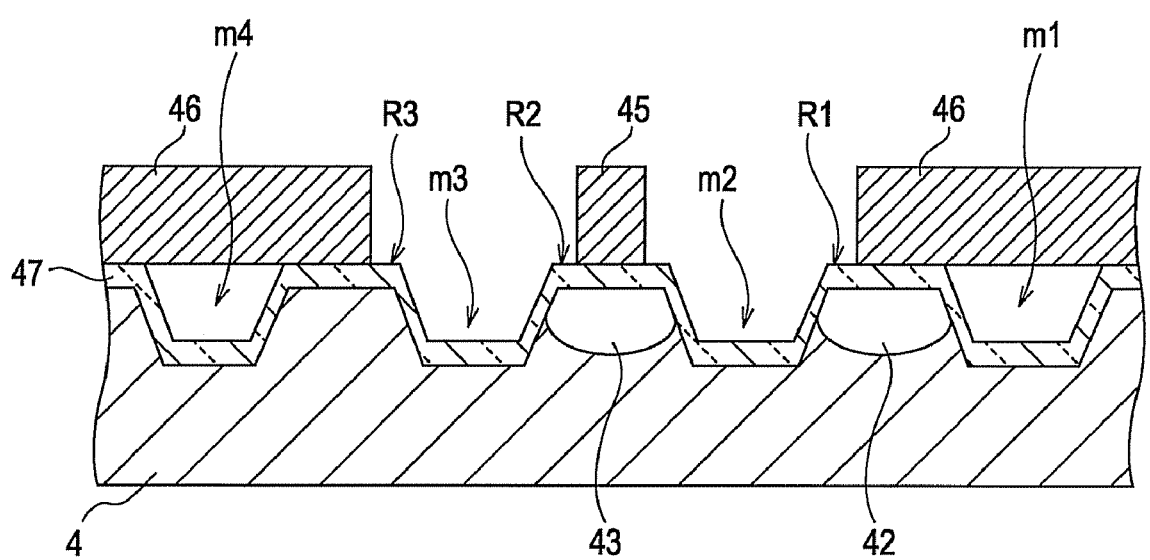
FIG. 25 is a cross-sectional view of the portion around the coupling portion.
Figure 26:
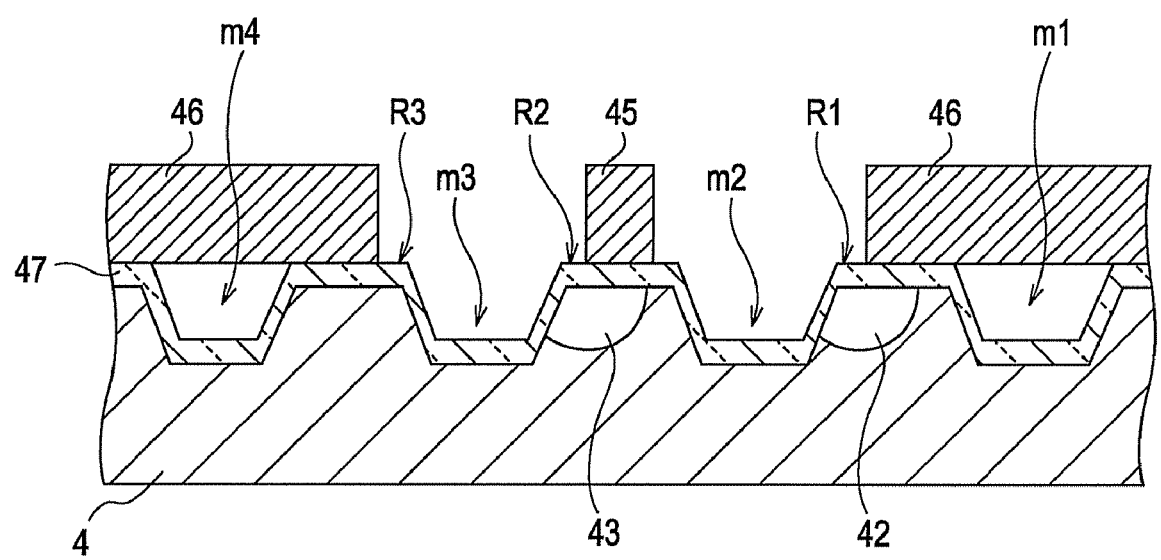
FIG. 26 is a cross-sectional view of the portion around the coupling portion.
Figure 27:
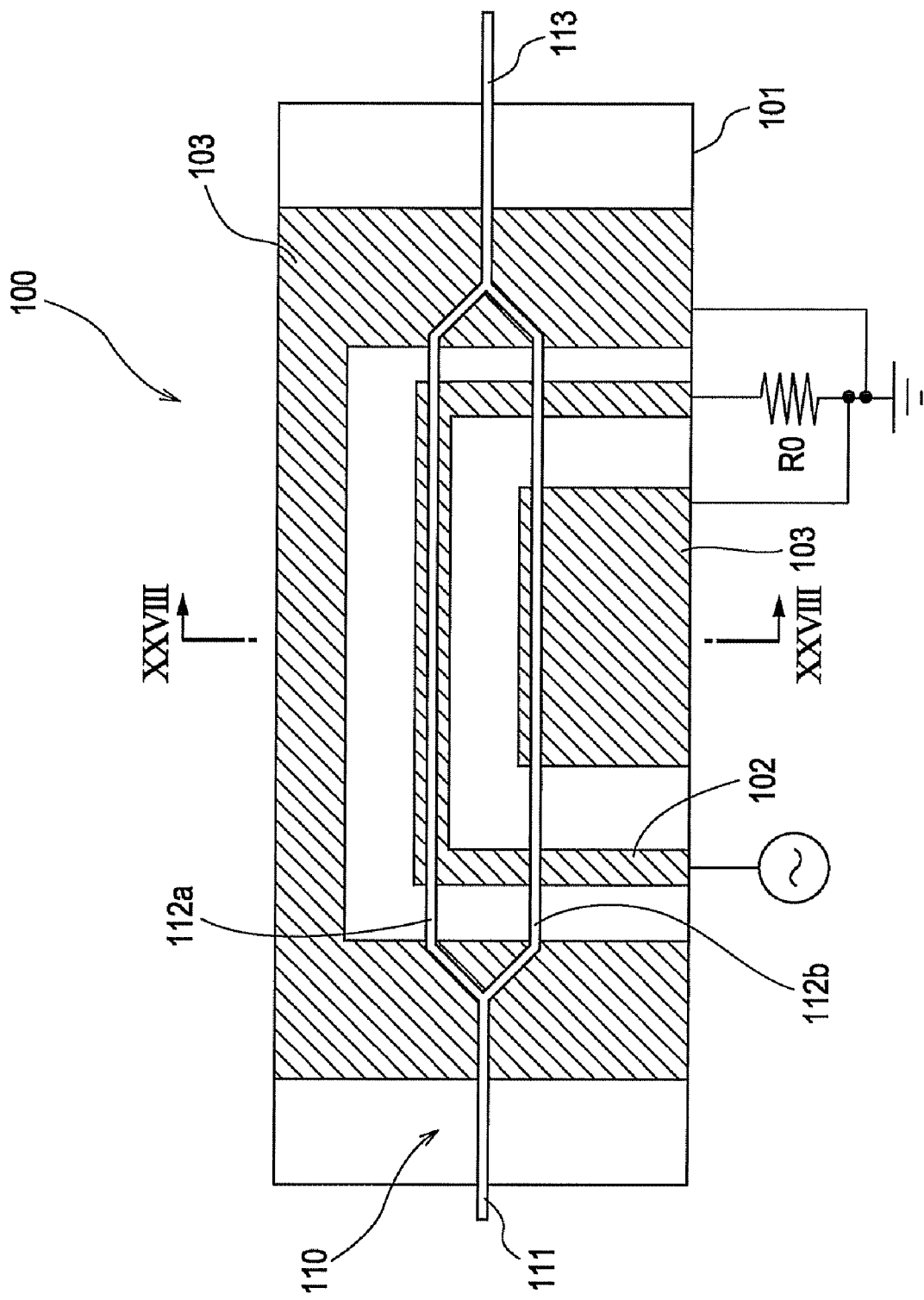
FIG. 27 is a view that illustrates an optical modulator.
Figure 28:
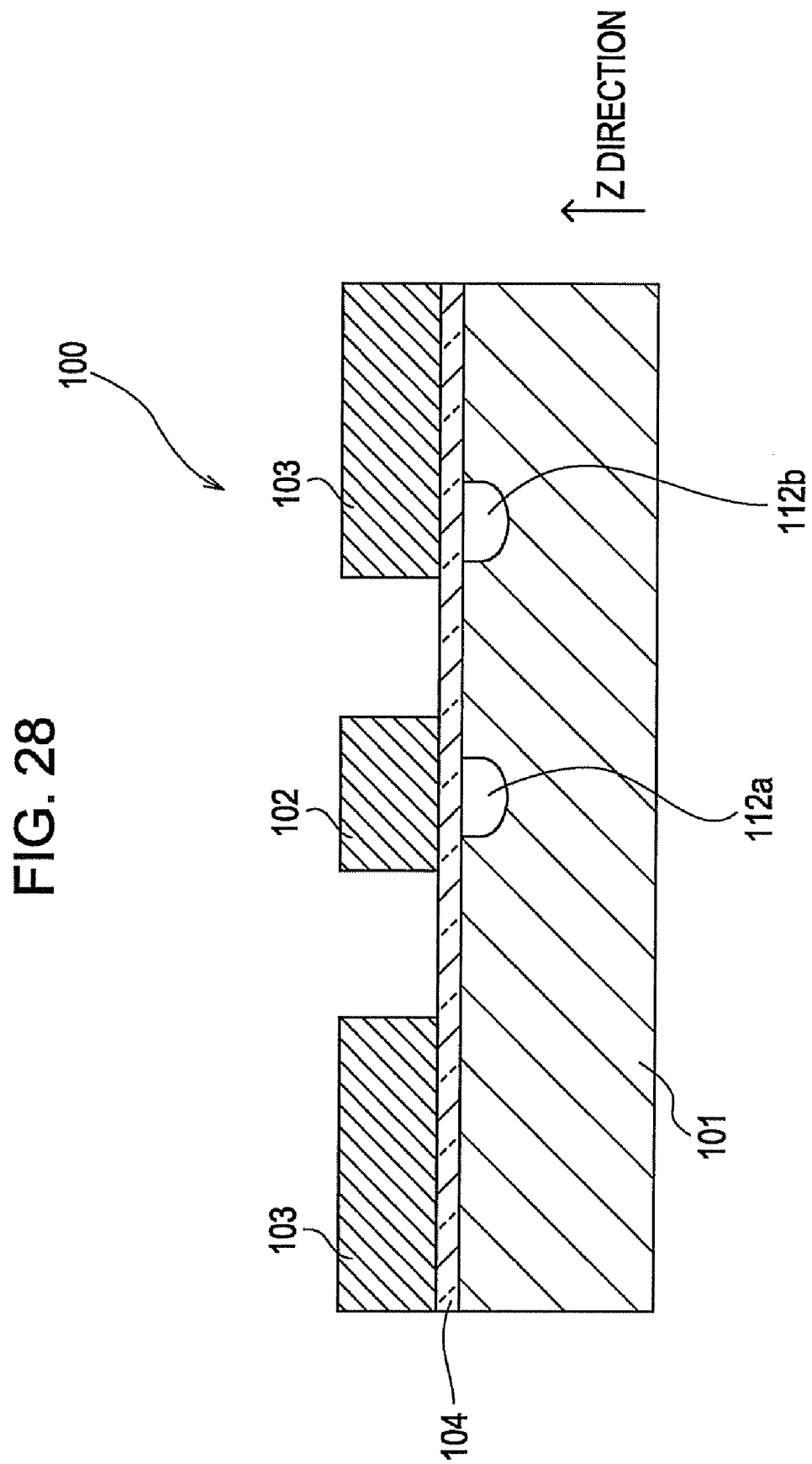
FIG. 28 is a cross-sectional view of the optical modulator.

FIG. 24 to FIG. 26 are cross-sectional views of a portion around the coupling portion. FIG. 24 illustrates a cross-sectional view that is taken along the line XXIV-XXIV in FIG. 23A. FIG. 25 is a cross-sectional view that is taken along the line XXV-XXV in FIG. 23A. FIG. 26 is a cross-sectional view that is taken along the line XXVI-XXVI in FIG. 23A.

The optical modulator 4 forms a ridge structure such that the grooves are provided on both side of the entire or a portion of the straight waveguides 42a and 43a and the entire curved waveguides 42b and 43b. Note that a buffer layer 47 is provided on the surface of the substrate 4a.

When the grooves are formed, as illustrated in the cross-sectional views, two grooves are provided on each side of the signal electrode 45, that is, the grooves m1 and m2 are provided on the inner peripheral of the signal electrode 45, and the grooves m3 and m4 are provided on the outer peripheral of the signal electrode 45. Thus, the ridge shape is symmetrical with respect to the signal electrode 45.

On the other hand, the ridge that is formed by the groove m1 and the groove m2 and has the inner waveguide 42 is referred to as a ridge R1, the ridge that is formed by the groove m2 and the groove m3 and has the outer waveguide 43 is referred to as a ridge R2, the ridge that is formed by the groove m3 and the groove m4 is referred to as a ridge R3, a concurrent waveguide zone up until light reaches the coupling portions between the straight waveguides 42a and 43a and the curved waveguides 42b and 43b is referred to as a light input side waveguide zone, and a concurrent waveguide zone to which light propagates from the coupling portions is referred to as a light output side waveguide zone.

Then, when the ridge width of each of the ridge R1, ridge R2 and ridge R3 that are present in the light input side waveguide zone and the light output side waveguide zone is Wa, the ridge width of each of the ridge R1, ridge R2 and ridge R3 that are present around the coupling portions is Wb, and the ridge width of each of the ridge R1, ridge R2 and ridge R3 that are present in a curved waveguide zone in which the curved waveguides 42b and 43b are located is Wc, the ridge width is formed in each waveguide zone so as to satisfy Wa=Wc>Wb (FIG. 23A).

With the above configuration, the symmetry of the electrodes (signal electrode 45 and ground electrode 46) is favorable, and the characteristic impedance of each electrode may be maintained at a predetermined value. Thus, it is possible to reduce a loss of microwaves.

On the other hand, when the optical waveguide is formed, the straight waveguides 42a and 43a are formed to have a waveguide width smaller than the ridge width (FIG. 24), the waveguide width of a portion around the coupling portions between the straight waveguides 42a and 43a and the curved waveguides 42b and 43b is formed so as to be larger than the ridge width (FIG. 25), and the curved waveguides 42b and 43b are formed to get close to the outer peripheral of the substrate 4a on the upper surfaces of the ridges. By so forming, a radiation loss is further reduced.

In addition, around the line XXV-XXV of the coupling portions, the ridge width is narrow and, therefore, there is a possibility that the signal electrode 45 on the ridge tends to deviate from the ridge due to a process error, or the like. To prevent this situation, the width of the signal electrode 45 may be narrowed only around the coupling portions (XXV-XXV) between the straight waveguides 42a and 43a and the curved waveguides 42b and 43b.

Furthermore, the characteristic impedance of each electrode not only depends on the width of the signal electrode 45, the thickness of the electrode and the space between the signal electrode 45 and the ground electrode 46, but also depends on the width and height of the ridge. The impedance is larger at a portion at which the width of the ridge is narrow or the width of the signal electrode 45 is narrower than the other portions. Thus, there is a possibility that discontinuity of impedance causes microwaves to reflect to thereby deteriorate modulation characteristic.

In order to prevent this situation, it is effective to take at least one of measures that the thickness of the electrode is increased, the space between the signal electrode 45 and the ground electrode 46 is narrowed, the grooves m1 to m4 are formed at a shallow depth, the thickness of the buffer layer 47 formed between the substrate 4a and the electrode is reduced, only at a portion around the coupling portions between the straight waveguides 42a and 43a and the curved waveguides 42b and 43b.

As explained in the embodiments above, it is possible to suppress an increase in optical radiation loss even when manufactured so that an error occurs in the distance between a curved waveguide having a small radius of curvature and a groove provided on the outer peripheral side of the waveguide and the distance is deviated from a desired designed value.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

I claim:

1. An optical waveguide device, comprising:
a dielectric substrate;
a folded waveguide formed on the substrate, the folded waveguide including a first waveguide and a second waveguide, one part of the first waveguide being connected to one end of the second waveguide at a first coupling portion, the other end of the second waveguide being connected to another part of the first waveguide at a second coupling portion, the first waveguide being straight or curved with a radius of curvature larger than or equal to a first curvature radius, and the second waveguide being straight or curved with a radius of curvature smaller than the first curvature radius;

an outer groove formed on the substrate along an outer peripheral of the folded waveguide;

an input-side inner groove formed on the substrate near the first coupling portion and provided on an inner peripheral of the first waveguide; and an output-side inner groove discontinuous from the input-side inner groove and formed on the substrate near the second coupling portion and provided on an inner peripheral of the first waveguide, wherein the outer groove and the input-side inner groove near the first coupling portion, and the outer groove and the output-side inner groove near the second coupling portion both form ridge structures.

2. The optical waveguide device according to claim 1, wherein near the first coupling portion, the outer groove and the input-side inner groove are formed so that a distance between an outer periphery of the first waveguide and an inner periphery of the outer groove and a distance between an inner periphery of the first waveguide and an outer periphery of the input-side inner groove are continuously narrowed toward a light propagation direction, and near the second coupling portion, the outer groove and the output-side inner groove are formed so that a distance between an outer periphery of the first waveguide and an inner periphery of the outer groove and a distance between an inner periphery of the first waveguide and an outer periphery of the output-side inner groove are continuously widened toward a light propagation direction.

3. The light waveguide device according to claim 2, wherein near the first coupling portion, the distance between the outer periphery of the first waveguide and the inner periphery of the outer groove and the inner periphery of the first waveguide and the outer periphery of the input-side inner groove are formed so as to be equal and symmetrical, and near the second coupling portion, the distance between the outer periphery of the first waveguide and the inner periphery of the outer groove and the distance between the inner periphery of the first waveguide and the outer periphery of the output-side inner groove are formed so as to be equal and symmetrical.

4. The optical waveguide device according to claim 1, further comprising a buffer layer formed on a surface of the substrate, wherein only on ridges around the first coupling portion and second coupling portion between the first waveguide and the second waveguide, the thickness and refractive index of the buffer layer on each side surface of the ridges are increased.

5. The optical waveguide device according to claim 1, further comprising gas filling both sides of ridges around the first coupling portion and second coupling portion between the first waveguide and the second waveguide.

6. The optical waveguide device according to claim 1, wherein the radius of curvature of the second waveguide is smaller than or equal to 4 mm, and the radius of curvature of the first waveguide exceeds 4 mm.

7. The optical waveguide device according to claim 1, wherein the widths of ridges near the first coupling portion and second coupling portion are smaller than or equal to 10 µm, and the depths of the ridges near the first coupling portion and second coupling portion between the first waveguide and the second waveguide are smaller than or equal to 3 µm.

8. The optical waveguide device according to claim 1, wherein the width of the second waveguide is larger than the width of the first waveguide near the first coupling portion and second coupling portion.

9. The optical waveguide device according to claim 1, wherein the entire upper portion of a ridge near the first coupling portion and the second coupling portion are formed as an optical waveguide.

10. The optical waveguide device according to claim 1, wherein the outer groove is in contact with the second waveguide.

11. The optical waveguide device according to claim 1, wherein the input-side inner groove is elongated toward an inner periphery of the second waveguide, with respect to a light input side elongated inner groove, which is an elongated inner groove portion, the width from the inner periphery of the second waveguide to an outer periphery of the light input side elongated inner groove is continuously widened in a light propagation direction, the output-side inner groove is elongated toward the inner periphery of the second waveguide, and with respect to a light output side elongated inner groove, which is an elongated inner groove portion, the width from the inner periphery of the second waveguide to an outer periphery of the light output side elongated inner groove is continuously narrowed in a light propagation direction.

12. The optical waveguide device according to claim 11, wherein the radius of curvature of the outer periphery of each of the light input side elongated inner groove and the light output side elongated inner groove is 30% to 60% of the radius of curvature of the inner periphery of the second waveguide.

13. The optical waveguide device according to claim 1, wherein the first waveguide on a light input side is formed so that the width of the first waveguide is tapered in a light propagation direction so that the width of the waveguide is continuously widened as it approaches the first coupling portion, and the first waveguide on a light output side is formed so that the width of the first waveguide is tapered in a light propagation direction so that the width of the waveguide is continuously narrowed as it leaves the second coupling portion.

14. An optical waveguide device, comprising:

a dielectric substrate;

a light input side Mach-Zehnder interferometer-type optical waveguide located on a light input side;

a light output side Mach-Zehnder interferometer-type optical waveguide located on a light output side;

a folded waveguide formed on the substrate, the folded waveguide including a first waveguide and a second waveguide, the first waveguide being connected to the light input side Mach-Zehnder interferometer-type optical waveguide and the light output side Mach-Zehnder interferometer-type optical waveguide, one part of the first waveguide being connected to one end of the second waveguide at a first coupling portion, the other end of the second waveguide connected to another part of the first waveguide at a second coupling portion, the first waveguide being straight or curved with a radius of curvature larger than or equal to a first curvature radius, and the second waveguide being curved with a radius of curvature smaller than the first curvature radius;

an outer groove formed on the substrate along an outer peripheral of the folded waveguide;

an input-side inner groove formed on the substrate near a first coupling portion and provided on an inner peripheral of the first waveguide; and an output-side inner groove formed on the substrate near a second coupling portion and provided on an inner peripheral of the first waveguide, wherein the outer groove and the input-side inner groove near the first coupling portion, and the outer groove and the output-side inner groove near the second coupling portion both form ridge structures.

15. An optical waveguide device, comprising:

a Mach-Zehnder interferometer-type folded waveguide that includes an input waveguide, a concurrent waveguide, and an output waveguide, the concurrent waveguide including an inner waveguide and an outer waveguide, the input waveguide being split to the inner waveguide and the outer waveguide, the inner waveguide and the outer waveguide being combined to the output waveguide, the inner waveguide and the outer waveguide respectively including a first waveguide and a second waveguide, one part of the first waveguide being connected to one end of the second waveguide at a first coupling portion, the other end of the second waveguide connected to another part of the first waveguide at a second coupling portion, respectively, the first waveguide being straight or a curved with a radius of curvature larger than or equal to a first curvature radius, the second waveguide being curved with a radius of curvature smaller than the first curvature radius;

a signal electrode formed on the outer waveguide;

a ground electrode formed on each side of the signal electrode;

a first groove that is formed on the substrate along an inner peripheral of the inner waveguide;

a second groove that is formed on the substrate along an outer peripheral of the inner waveguide and an inner peripheral of the outer waveguide;

a third groove that is formed on the substrate along an outer peripheral of the outer waveguide; and a fourth groove that is formed on the substrate along an outer peripheral of the third groove.

16. The optical waveguide device according to claim 15, wherein when a ridge that is formed by the first groove and the second groove and includes the inner waveguide is a first ridge, a ridge that is formed by the second groove and the third groove and includes the outer waveguide is a second ridge, and a ridge that is formed by the third groove and the fourth groove is a third ridge, with respect to a coupling portion, the ridge width of each of the first ridge, the second ridge and the third ridge that are present in a light input side waveguide zone, which is a concurrent waveguide zone up until light reaches the coupling portion and in a light output side waveguide zone, which is a concurrent waveguide zone to which light propagates from the coupling portion, is Wa, the ridge width of each of the first ridge, the second ridge and the third ridge that are present near the coupling portion is Wb, and the ridge width of each of the first ridge, the second ridge and the third ridge that are present in a curved waveguide zone, which is a waveguide zone in which the second waveguide is located, is Wc, the ridge widths are formed so as to satisfy Wa=Wc>Wb.

17. The optical waveguide device according to claim 15, wherein the width of the signal electrode is narrowed only near coupling portions between the first waveguides and the second waveguides.

18. The optical waveguide device according to claim 15, wherein the first waveguides that are formed concurrent to each other on the substrate are formed so that the waveguide width of each of the first waveguides is smaller than a ridge width, the waveguide width of each of the first waveguides and the second waveguides, which are located around coupling portions between the first waveguides and the second waveguides, is larger than the ridge width, and each of the second waveguides, which are waveguide portions having a small radius of curvature, is formed on an upper surface of the ridge so as to near an outer peripheral of the substrate.

19. The optical waveguide device according to claim 15, wherein a height of the signal electrode and a height of each ground electrode are increased only near coupling portions between the first waveguides and the second waveguides.

20. The optical waveguide device according to claim 15, wherein a distance between the signal electrode and the ground electrode is narrowed only near coupling portions between the first waveguides and the second waveguides.

21. The optical waveguide device according to claim 15, wherein the first groove, the second groove, the third groove and the fourth groove are formed at a shallow depth only near coupling portions between the first waveguides and the second waveguides.

22. The optical waveguide device according to claim 15, further comprising a buffer layer formed on a surface of the substrate, wherein the thickness of the buffer layer formed between the substrate and the signal electrode is reduced, and the thickness of the buffer layer formed between the substrate and each ground electrode is reduced.

23. An optical waveguide device, comprising:

a dielectric substrate;

folded waveguide formed on the substrate, the folded waveguide including a front waveguide, a curved waveguide, and a rear waveguide cascaded;

an outer groove formed on the substrate along an outer peripheral of the curved waveguide;

an input-side inner groove formed on the substrate near a first coupling portion, corresponding to one end of the front waveguide and one end of the curved waveguide, and provided on an inner peripheral of the front waveguide; and an output-side inner groove discontinuous from the input-side inner groove and formed on the substrate near a second coupling portion, corresponding to one end of the rear waveguide and the other end of the curved waveguide, and provided on an inner peripheral of the front waveguide.

* * * * *

UNITED STATES PATENT AND TRADEMARK OFFICE
CERTIFICATE OF CORRECTION

PATENT NO. : 7,817,879 B2
APPLICATION NO. : 12/366077
DATED : October 19, 2010
INVENTOR(S) : Masaki Sugiyama It is certified that error appears in the above-identified patent and that said Letters Patent is hereby corrected as shown below:

Column 20, Line 48 in Claim 23, before "folded waveguide formed" insert -- a --.

Signed and Sealed this
Eighteenth Day of January, 2011

David J. Kappos
*Director of the United States Patent and Trademark Office*